(12) United States Patent
Onoda et al.

(10) Patent No.: US 7,494,594 B2
(45) Date of Patent: Feb. 24, 2009

(54) METHOD OF MANUFACTURING AN ELECTROSTATIC ACTUATOR

(75) Inventors: Kunihiro Onoda, Nagoya (JP); Hideaki Nishikawa, Nagoya (JP); Tetsuo Yoshioka, Okazaki (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 11/633,452

(22) Filed: Dec. 5, 2006

(65) Prior Publication Data

US 2007/0075033 A1    Apr. 5, 2007

Related U.S. Application Data

(62) Division of application No. 10/771,636, filed on Feb. 5, 2004, now abandoned.

(30) Foreign Application Priority Data

Feb. 12, 2003   (JP) ............... 2003-34098
Nov. 7, 2003    (JP) ............... 2003-379087

(51) Int. Cl.
*C23F 1/00* (2006.01)

(52) U.S. Cl. ............... 216/2; 216/27; 216/37; 216/67; 347/40; 347/54; 347/68; 347/70; 347/71; 347/94; 361/700

(58) Field of Classification Search ........ 216/2; 257/414; 347/54
See application file for complete search history.

(56) References Cited

U.S. PATENT DOCUMENTS

| | | | |
|---|---|---|---|
| 5,461,916 A | 10/1995 | Fujii et al. | |
| 5,780,948 A | 7/1998 | Lee et al. | |
| 6,000,280 A | 12/1999 | Miller et al. | |
| 6,312,134 B1 | 11/2001 | Jain et al. | |
| 6,330,102 B1 | 12/2001 | Daneman et al. | |
| 6,437,902 B2 | 8/2002 | Daneman et al. | |
| 6,480,319 B2 | 11/2002 | Daneman et al. | |
| 6,593,677 B2 | 7/2003 | Behin et al. | |
| 6,612,029 B2 | 9/2003 | Behin et al. | |
| 6,628,856 B1 | 9/2003 | Costello et al. | |

(Continued)

FOREIGN PATENT DOCUMENTS

JP   A-2002-181551   6/2002

(Continued)

OTHER PUBLICATIONS

Office Action dated Oct. 1, 2008 in corresponding Japanese patent application No. 2003-379087 (an English translation).

*Primary Examiner*—Duy-Vu Deo
*Assistant Examiner*—Maki Angadi
(74) *Attorney, Agent, or Firm*—Posz Law Group, PLC

(57) ABSTRACT

An electrostatic actuator for increasing a swing (deflection angle) of a movable structure includes a laminate substrate in which a thin film silicon layer is formed on a silicon substrate through a buried insulating film and a torsion beam movable structure constructed with the thin film silicon layer. A potential difference is generated between a movable side comb-tooth electrode of the movable structure and a fixed side comb-tooth electrode disposed to face the movable side comb-tooth electrode to swing the movable structure. The fixed side comb-tooth electrode is formed in the inside of a through hole bored through the laminate substrate.

2 Claims, 31 Drawing Sheets

U.S. PATENT DOCUMENTS

| | | |
|---|---|---|
| 6,629,461 B2 | 10/2003 | Behin et al. |
| 6,643,053 B2 | 11/2003 | Li et al. |
| 6,686,639 B1 | 2/2004 | Tsai |
| 6,713,367 B2 | 3/2004 | Solgaard et al. |
| 6,744,173 B2 | 6/2004 | Behin et al. |
| 6,758,983 B2 | 7/2004 | Conant et al. |
| 6,819,820 B1 | 11/2004 | Chaparala et al. |
| 6,819,822 B2 | 11/2004 | Behin et al. |
| 6,872,319 B2 | 3/2005 | Tsai |
| 6,888,979 B2 | 5/2005 | Behin et al. |
| 7,023,604 B2 | 4/2006 | Behin et al. |
| 2001/0034938 A1 | 11/2001 | Behin et al. |
| 2001/0040419 A1 | 11/2001 | Behin et al. |
| 2001/0043386 A1 | 11/2001 | Daneman et al. |
| 2002/0021055 A1 | 2/2002 | Lee et al. |
| 2002/0026830 A1 | 3/2002 | Otani |
| 2002/0046985 A1 | 4/2002 | Daneman et al. |
| 2004/0155556 A1 | 8/2004 | Onoda et al. |
| 2004/0163226 A1 | 8/2004 | Lee et al. |
| 2004/0247237 A1 | 12/2004 | Charparala et al. |

FOREIGN PATENT DOCUMENTS

| | | |
|---|---|---|
| WO | WO 01/73937 A2 | 10/2001 |

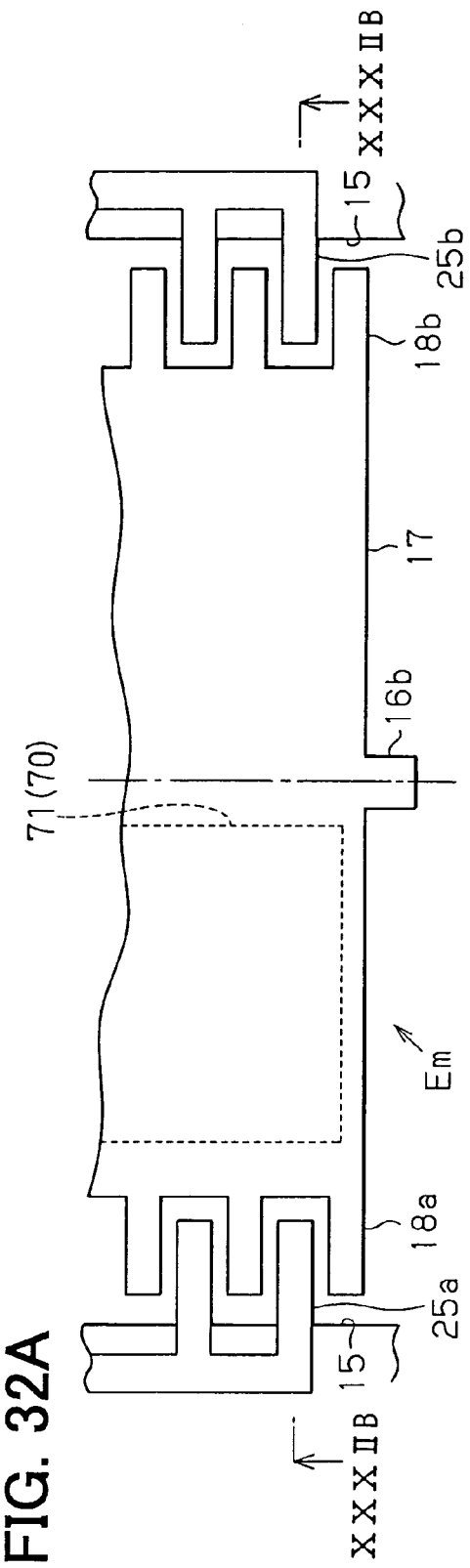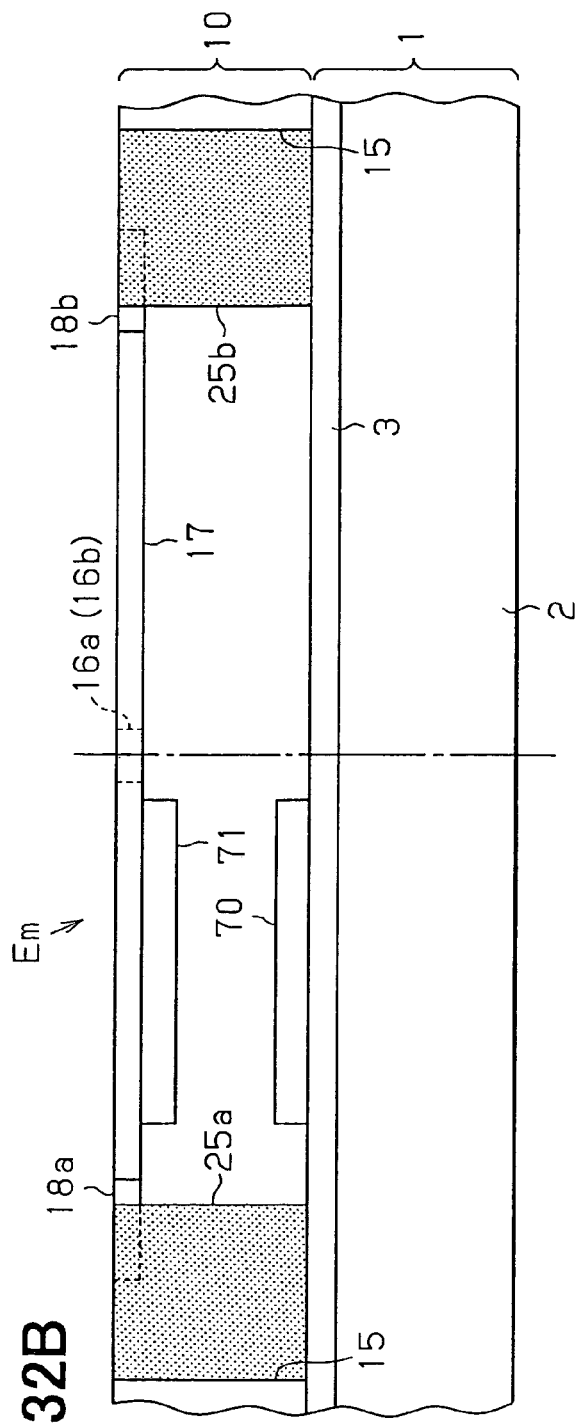

METHOD OF MANUFACTURING AN ELECTROSTATIC ACTUATOR

CROSS REFERENCE TO RELATED APPLICATIONS

This application is a divisional application of U.S. application Ser. No. 10/771,636, which was filed on Feb. 5, 2004, now abandoned. This application is based upon, claims the benefit of priority of, and incorporates by reference the contents of Japanese Patent Application No. 2003-34098 filed on Feb. 12, 2003 and Japanese Patent Application No. 2003-379087 filled on Nov. 7, 2003.

FIELD OF THE INVENTION

The present invention relates generally to an optical scanner and more particularly to an electrostatic actuator for the optical scanner.

BACKGROUND OF THE INVENTION

A scanning mirror for an optical scanner may be driven by an electrostatic drive type actuator (electrostatic actuator) having a high consistency with a CMOS process. The electrostatic actuator may be a counter electrode type drive system as shown in FIG. 34 or a comb-tooth electrode type drive system as shown in FIG. 35.

Referring to FIG. 34, the counter electrode type drive system includes a mirror (mass part) 100 coupled to a torsion beam 101, and a fixed side counter electrode 103 disposed to face a movable side counter electrode 102 of the mirror (mass part) 100.

Referring to FIG. 35, the comb-tooth electrode type drive system includes a mirror (mass part) 110 coupled to a torsion beam 111, and a fixed side comb-tooth electrode 113 disposed to face a movable side comb-tooth electrode 112 of the mirror (mass part) 110.

Single crystal silicon is the preferred material for constituting the mirror surface because of its associated flatness and smoothness. However, when single crystal silicon is used, formation of the counter electrode type drive system of FIG. 34 becomes complicated, and the comb-tooth electrode type of FIG. 35 is preferred.

In an electrostatic drive type microscanner using the comb-tooth electrode of FIG. 35, driving force is electrostatic attraction generated from a potential difference between the fixed side comb-tooth electrode 113 and the movable side comb-tooth electrode 112. A rotation force is achieved by providing a height difference between both of the electrodes. More particularly, a maximum displacement at this time corresponds to the electrode height difference.

However, referring to FIG. 36, there is a case where a structure is used in which a silicon oxide film 121, a thin film silicon layer 122, a silicon oxide film 123, and a metal film 124 are formed in sequence on a silicon substrate 120, and the metal film 124 is formed as an electrode. In this case, a movable side comb-tooth electrode is constructed with the thin film silicon layer 122, and a fixed side comb-tooth electrode is constructed with the metal film 124.

Here, the height difference between the movable side comb-tooth electrode 122 and the fixed side comb-tooth electrode 124 becomes as follows.

Referring to FIG. 37, the thickness of the thin film silicon layer 122 is designated by Ts, the thickness of the silicon oxide film 123 is designated by To, and the thickness of the metal film 124 is designated by Tm, the electrode height difference becomes $\{(Ts+Tm)/2\}+To$. Because the electrode height difference is limited by the film thickness Ts of the thin film silicon layer 122 (as stated above), a large displacement (scan angle) cannot be obtained.

More particularly, when the movable side comb-tooth electrode is the thin film silicon layer 122, and the fixed side comb-tooth electrode is the metal film 124 formed on the thin film silicon layer 122 through the oxide film 123, the height difference becomes the height difference between the center points of both the electrodes. Then, for example, even when the thickness Ts of the thin film silicon layer (mirror) 122 is made 10 μm, and the thicknesses To and Tm of the silicon oxide film 123 and the metal film 124 are made 1 μm, respectively, the electrode height difference becomes 6.5 μm. In the case where the size of the mirror part (thin film silicon layer) in length and breadth is made 1000 μm, the maximum displacement becomes $\tan^{-1}(6.5/500)=0.74°$, and the scan angle is limited to twice the value, that is, 1.5°.

On the other hand, although a large displacement can be obtained when resonance is used, in this case, the operation is limited to resonant driving at a resonant frequency.

SUMMARY OF THE INVENTION

The invention has been made under such circumstances, and an object thereof is to provide an electrostatic actuator for increasing a swing (deflection angle) of a movable structure, and a manufacturing method of the same.

According to a first aspect of the invention, the following operation and effects are obtained.

A comparison is made between: (i) A case where a movable side comb-tooth electrode is constructed with a thin film silicon layer of a laminate substrate, and a fixed side comb-tooth electrode is formed on the thin film silicon layer of the laminate substrate; and (ii) a case where a movable side comb-tooth electrode is constructed with a thin film silicon layer of a laminate substrate and a fixed side comb-tooth electrode is formed in the inside of a through hole bored through the laminate substrate.

As compared with the case (i), in the case (ii), it becomes possible to increase a difference between the center position of the movable side comb-tooth electrode and the center position of the fixed side comb-tooth electrode in the vertical direction, and a swing (deflection angle) of a movable structure can be increased.

According to a second aspect of the invention, the fixed side comb-tooth electrode is preferably made of metal or polysilicon.

According to a third aspect of the invention, three or more pairs of movable side and fixed side comb-tooth electrodes are provided, so that electrostatic force by a potential difference between the movable side comb-tooth electrode and the fixed side comb-tooth electrode can be increased.

According to a fourth aspect of the invention, the movable side comb-tooth electrode is provided at a torsion beam of the movable structure, so that it becomes possible to decrease a displacement amount of the comb-tooth electrode to a deflection angle and thereby increase the deflection angle.

According to a fifth aspect of the invention, teeth provided side by side in the movable side comb-tooth electrode and the torsion beam of the movable structure are provided to extend in a same direction, and lengths of the teeth provided side by side in the movable side comb-tooth electrode are made half or more of a length of the torsion beam so that the electrostatic force by the potential difference between the movable side comb-tooth electrode and the fixed side comb-tooth electrode can be increased.

According to a sixth aspect of the invention, the teeth provided side by side in the fixed side comb-tooth electrode formed in the inside of the through hole are different from each other in center positions in a vertical direction so that it is possible to intensify the electrostatic force by the potential difference between the movable side comb-tooth electrode and the fixed side comb-tooth electrode when the movable side comb-tooth electrode is swung (when deflected).

According to a seventh aspect of the invention, when reflected light of a laser beam intermittently irradiated to the movable structure is emitted in a specified angle range in accordance with the swing of the movable structure, the movable structure is forcibly swung in synchronization with a period of intermittent irradiation of the laser beam by the potential difference generated between the movable side comb-tooth electrode and the fixed side comb-tooth electrode, which becomes desirable in practical use.

According to an eighth aspect of the invention, a capacity measurement fixed electrode is provided on a support substrate disposed under the laminate substrate and a capacity measurement movable electrode is provided on the movable structure, facing the capacity measurement fixed electrode, and performing displacement in a direction of approaching and going away from the capacity measurement fixed electrode in accordance with the swing of the movable structure. While capacity between the capacity measurement fixed electrode and the capacity measurement movable electrode is measured to obtain a swing angle of the movable structure, the potential difference generated between the movable side comb-tooth electrode and the fixed side comb-tooth electrode is controlled to obtain a desired swing angle of the movable structure or to perform a swing operation, which becomes desirable in practical use.

According to a ninth aspect of the invention, the movable structure is swung so that reflected light of a laser beam irradiated to the movable structure is directed toward a distance measurement object at a specified place in an image taken by a camera, which is desirable in practical use.

According to tenth and eleventh aspects of the invention, the electrostatic actuator of the first aspect can be manufactured.

Especially, according to the eleventh aspect of the invention, a protection film is used as an etching stopper, so that a conductive material which becomes the fixed side comb-tooth electrode is protected against etching.

BRIEF DESCRIPTION OF THE DRAWINGS

The above and other objects, features and advantages of the present invention will become more apparent from the following detailed description made with reference to the accompanying drawings. In the drawings:

FIG. 30A is a voltage waveform applied to comb-tooth electrode 25a;

FIGS. 32A-32B are top and side views for explaining an optical scanner of an applied example;

DETAILED DESCRIPTION OF THE INVENTION

Hereinafter, embodiments of the invention will be described with reference to the drawings.

Figure 1:
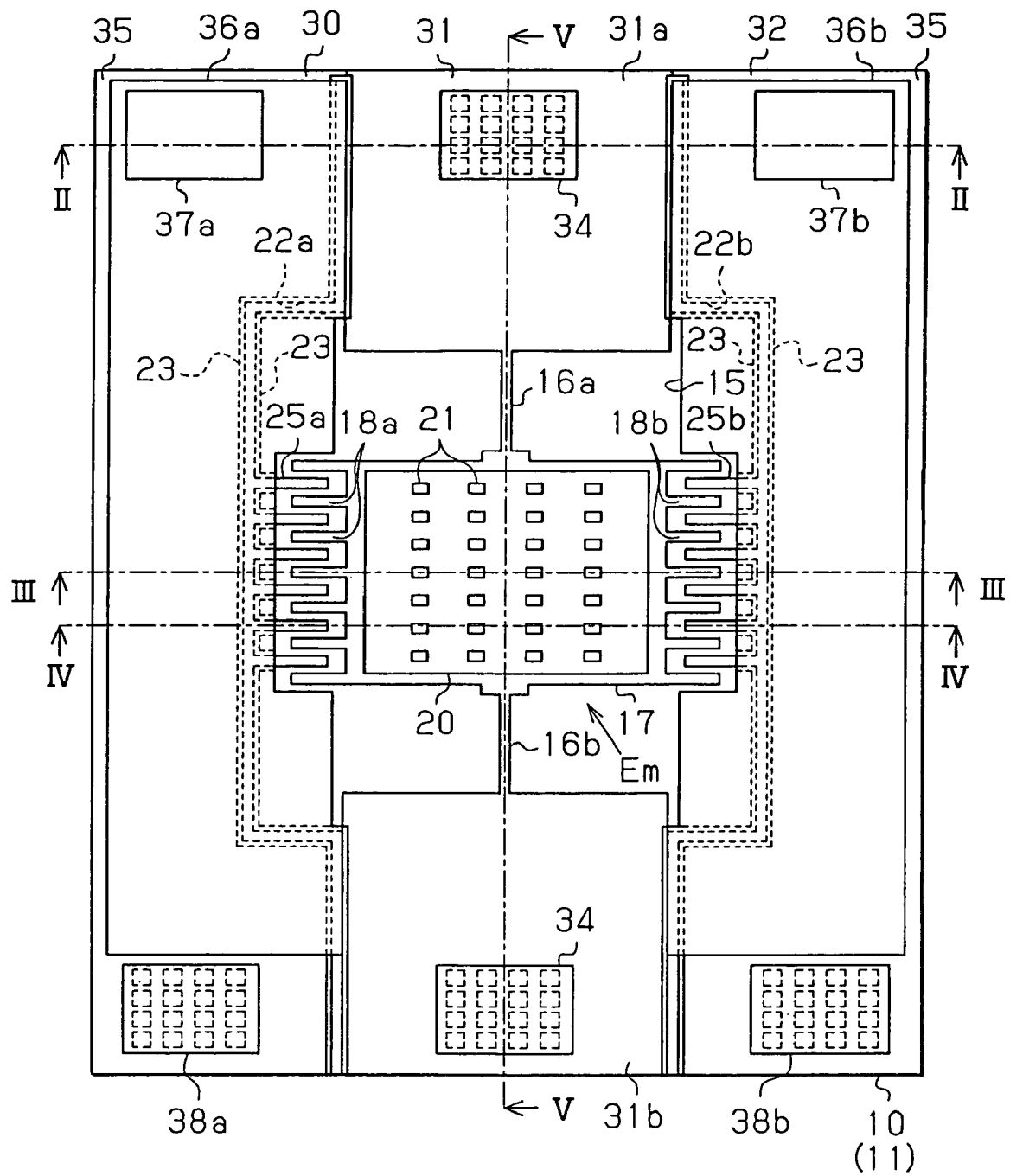
FIG. 1 is a plan view of an optical scanner according to a preferred embodiment.
Figure 2:
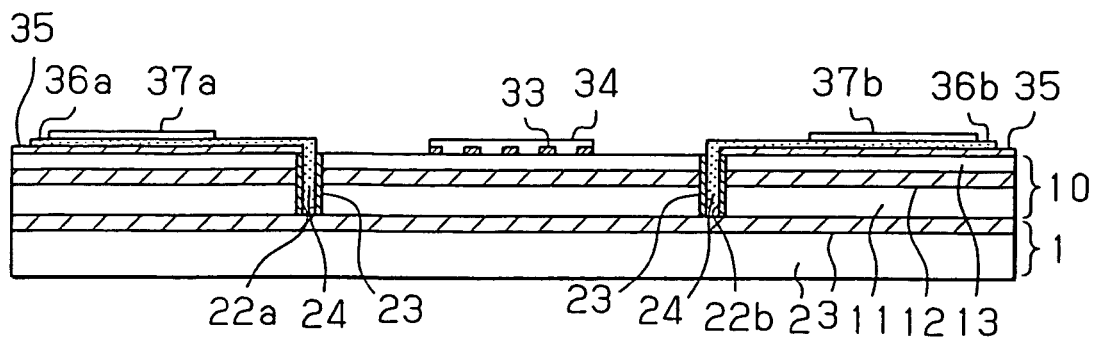
FIG. 2 is a longitudinal sectional view taken along line II-II of FIG. 1.

FIG. 1 is a plan view of an optical scanner as an electrostatic actuator of an embodiment. FIG. 2 is a longitudinal sectional view taken along line II-II of FIG. 1, FIG. 3 is a longitudinal sectional view taken along line III-III of FIG. 1, FIG. 4 is a longitudinal sectional view taken along line IV-IV of FIG. 1, and FIG. 5 is a longitudinal sectional view taken along line V-V of FIG. 1.

In this embodiment, as shown in FIG. 2 and others, a laminate substrate 10 is joined onto a support substrate 1. The support substrate 1 is constructed by forming a silicon oxide film 3 on a silicon substrate 2. The laminate substrate 10 is constructed by forming a thin film silicon layer 13 on a silicon substrate 11 through a buried oxide film (buried insulating film) 12.

Figure 3:
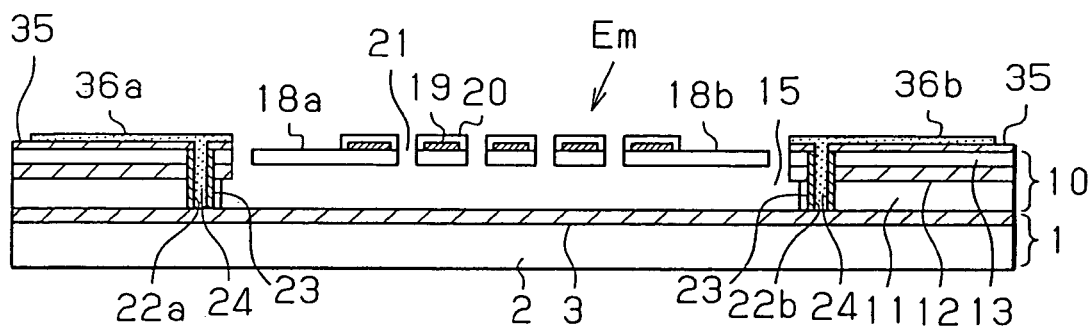
FIG. 3 is a longitudinal sectional view taken along line III-III of FIG. 1.
Figure 4:
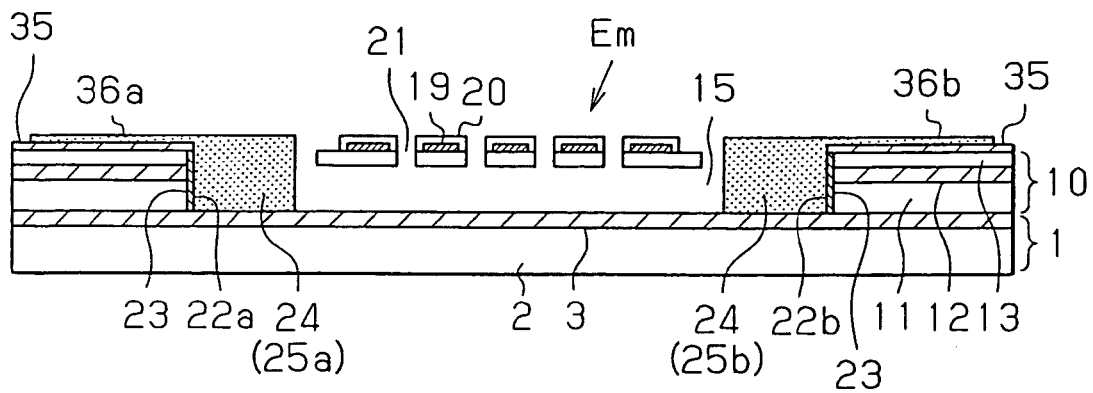
FIG. 4 is a longitudinal sectional view taken along line IV-IV of FIG. 1.
Figure 5:
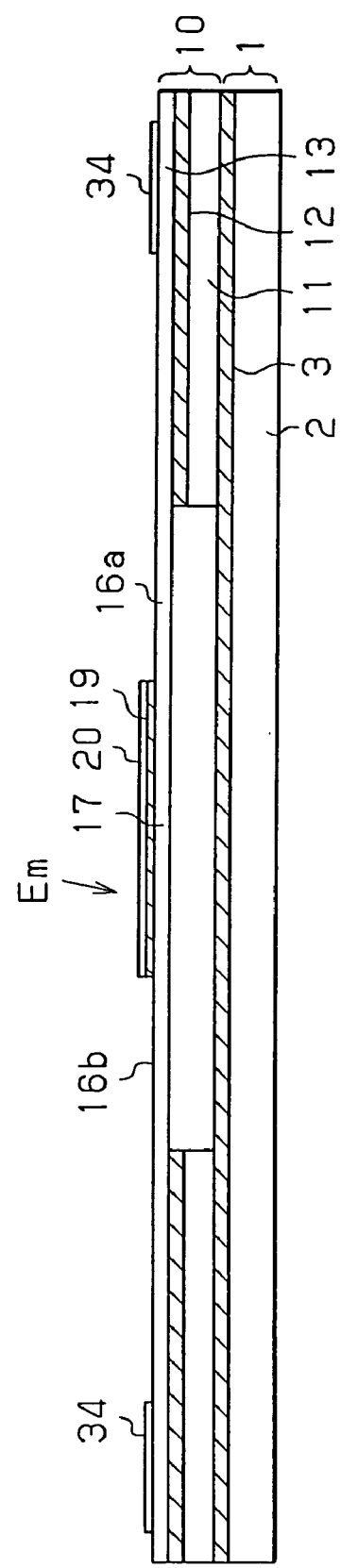
FIG. 5 is a longitudinal sectional view taken along line V-V of FIG. 1.

As shown in FIGS. 1, 3 and 4, a through hole (trench) 15 is formed in the laminate substrate 10, and this trench (through hole 15) reaches the silicon oxide film 3. As shown in FIG. 1, a movable structure Em is partitioned and formed at the center part of the rectangular laminate substrate 10 by means of the through hole 15. As shown in FIGS. 3, 4 and 5, the buried oxide film 12 and the silicon substrate 11 in the formation area of the movable structure Em are removed. As stated above, the movable structure Em is constructed with the thin film silicon layer 13. As shown in FIG. 1, the movable structure Em is provided with torsion beams 16a and 16b and a movable part (mass part) 17 coupled to the torsion beams 16a and 16b. Particularly, the movable part (mass part) 17 has a rectangular shape, and the rod-like torsion beams 16a and 16b extend linearly through the center parts of the long sides of the rectangular movable part 17. Then, the movable part 17 coupled to the rod-like beams 16a and 16b can be swung around a line connecting the rod-like beams 16a and 16b.

Comb-tooth electrodes 18a and 18b are formed at the short sides of the rectangular movable part 17. Further, as shown in FIG. 5, a reflection film 20 is formed on the upper surface of the rectangular movable part 17 through a silicon oxide film 19. The reflection film 20 is made of aluminum or the like. As shown in FIG. 1, many transmission holes 21 are formed in the rectangular movable part 17. Each of the transmission holes 21 preferably has a rectangular shape with a size of about 3 μm in length and breadth, and a pitch (interval between the adjacent transmission holes 21) of about 180 μm.

As shown in FIGS. 1 and 2, through holes 22a and 22b are formed in the laminate substrate 10 (laminated body of the silicon substrate 11, the buried oxide film 12 and the thin film silicon layer 13), and the through holes 22a and 22b extend linearly. Silicon oxide films 23 are formed on the inner walls of the through holes 22a and 22b, and the insides thereof are filled with polysilicon films 24. As shown in FIG. 1, fixed side comb-tooth electrodes 25a and 25b are constructed with the polysilicon films 24. The fixed side comb-tooth electrodes 25a and 25b protrude from the sides of the through hole 15, and face the movable side comb-tooth electrodes 18a and 18b of the movable structure Em.

The laminate substrate 10 (laminated body of the silicon substrate 11, the buried oxide film 12 and the thin film silicon layer 13) is divided into three areas 30, 31 and 32 by the through holes 22a and 22b provided to be extended. The area 31 is made of a first fixed side member (first fixed electrode part) 31a and a second fixed side member (second fixed electrode part) 31b, and the torsion beam 16a is extended from the first fixed side member (first fixed electrode part) 31a. Also, the torsion beam 16b is extended from the second fixed side member (second fixed electrode part) 31b. The comb-tooth electrode 25a is extended in the area 30 and the comb-tooth electrode 25b is extended in the area 32.

A width of each of the teeth of the fixed side comb-tooth electrodes 25a and 25b and the movable side comb-tooth electrodes 18a and 18b is, for example, about 3 μm, and a pitch (interval between the teeth) of the respective teeth is about 12 μm. Further, a distance between the fixed side comb-tooth electrode 25a, 25b and the movable side comb-tooth electrode 18a, 18b disposed to face each other is about 4 μm.

Referring to FIGS. 1 and 2, in the area 31 of the laminate substrate 10 (laminated body of the silicon substrate 11, the buried oxide film 12 and the thin film silicon layer 13), a pad 34 is formed on the laminate substrate 10 through a silicon oxide film 33 in such a state that the pad is electrically connected to the thin film silicon layer 13. The pad 34 is made of aluminum or the like, and voltage can be applied to the movable side comb-tooth electrodes 18a and 18b through the pad 34.

In the area 30 of the laminate substrate 10 (laminated body of the silicon substrate 11, the buried oxide film 12 and the thin film silicon layer 13), as shown in FIGS. 2, 3 and 4, a polysilicon film 36a as a wiring member is formed in a specified area through a silicon oxide film 35. This polysilicon film 36a is electrically connected to the fixed side comb-tooth electrode 25a made of polysilicon. A pad 37a is formed on the polysilicon film 36a, and the pad 37a is made of aluminum or the like. Then, voltage can be applied to the fixed side comb-tooth electrode 25a from the pad 37a through the polysilicon film 36a. Similarly, in FIG. 1, in the area 32 of the laminate substrate 10, as shown in FIGS. 2, 3 and 4, a polysilicon film 36b as a wiring member is formed in a specified area through a polysilicon oxide film 35, and the polysilicon film 36b is electrically connected to the fixed side comb-tooth electrode 25b made of polysilicon. A pad 37b is formed on the polysilicon film 36b, and the pad 37b is made of aluminum or the like. Then, voltage can be applied to the fixed side comb-tooth electrode 25b from the pad 37b through the polysilicon film 36b.

In the areas 30 and 32 of the laminate substrate 10, pads 38a and 38b are formed in portions where the polysilicon films 36a and 36b are not provided. The thin film silicon layer 13 in the areas 30 and 32 is fixed to the ground potential through the pads 38a and 38b.

Then, voltage is applied between the movable side comb-tooth electrode 18a, 18b and the fixed side comb-tooth electrode 25a, 25b so that the electrostatic force is exerted. Specifically, the movable side comb-tooth electrodes 18a and 18b are made to have ground potential, and AC voltages with reverse phases are applied to the fixed side comb-tooth electrodes 25a and 25b, respectively. Then, the electrostatic force is balanced with the restoring force of torsion and a forced drive is carried out.

In this way, the laminate substrate 10 is used in which the thin film silicon layer 13 is formed on the silicon substrate 11 through the buried oxide film 12, and the torsion beam structural movable structure Em is constructed with the thin film silicon layer 13. Then, the potential difference is produced between the movable side comb-tooth electrode 18a, 18b of this movable structure Em and the fixed side comb-tooth electrode 25a, 25b disposed to face the movable side comb-tooth electrode 18a, 18b, and the movable structure Em is swung. That is, the direction of the reflection film 20 is changed in accordance with the swing (deflection) of the movable part 17 as the light reflection part. By this, the direction of light (for example, laser beam) irradiated to the reflection film 20 is changed (optical path is changed) and scanning is performed.

Here, with reference to FIGS. 6A-6B, a height difference between the movable side comb-tooth electrode 18a, 18b and the fixed side comb-tooth electrode 25a, 25b, that is, a difference between the center position of the movable side comb-tooth electrode 18a, 18b and the center position of the fixed side comb-tooth electrode 25a, 25b in the vertical direction will be described.

Figure 6A:
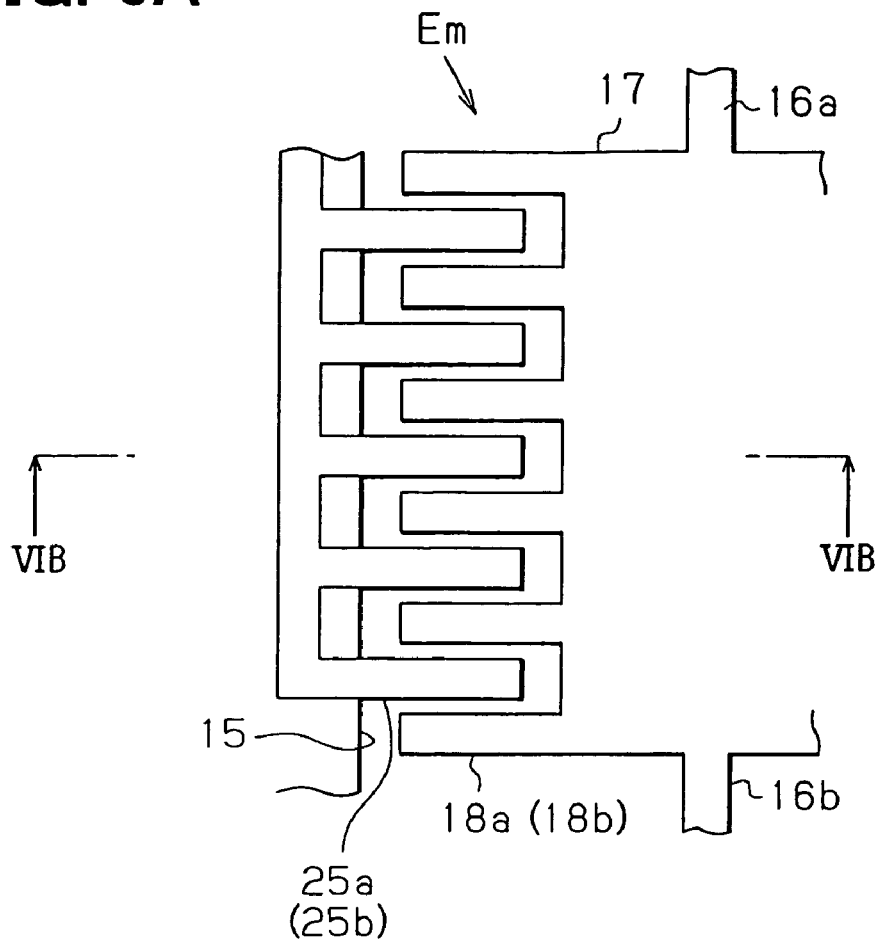
FIGS. 6A-6B are illustrations of the positional relationship between a movable side comb-tooth electrode and a fixed side comb-tooth electrode.
Figure 6B:
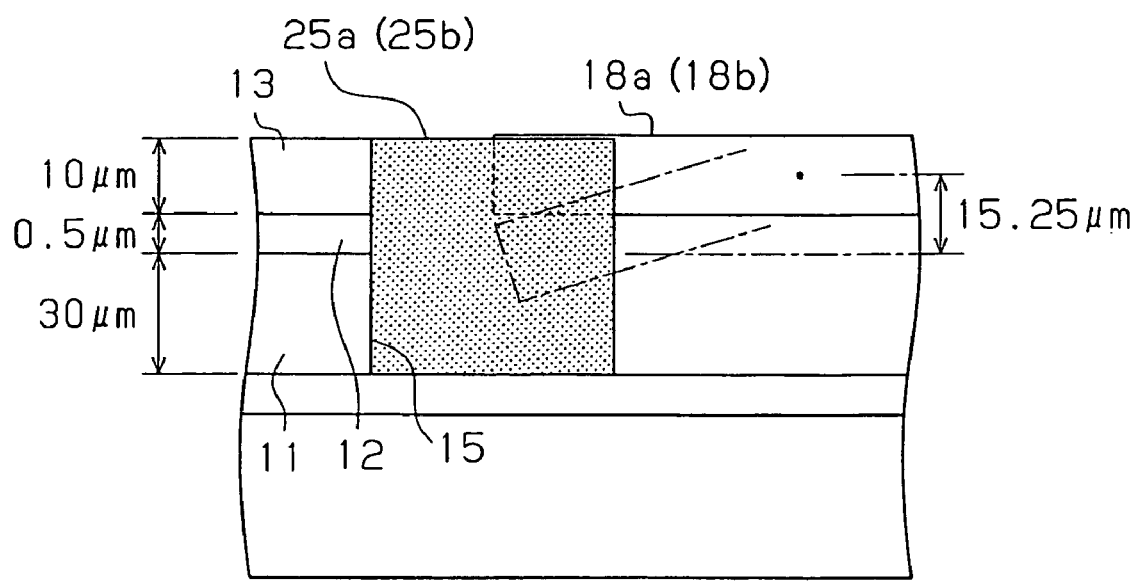

In FIGS. 6A-6B, consideration will be given to a case where the thickness of the silicon substrate 11 is 30 μm, the thickness of the buried oxide film 12 is 0.5 μm, and the thickness of the thin film silicon layer 13 is 10 μm. The fixed side comb-tooth electrodes 25a and 25b are formed in the inside of the through hole 15 bored through the laminate substrate. Besides, the movable side comb-tooth electrodes 18a and 18b are constructed with the thin film silicon layer 13 of the laminate substrate. Thus, the difference between the center position of the movable side comb-tooth electrode 18a, 18b and the center position of the fixed side comb-tooth electrode 25a, 25b in the vertical direction becomes $\{(10+0.5+30)/2\}-(10/2)=15.25$ μm.

Figure 37:
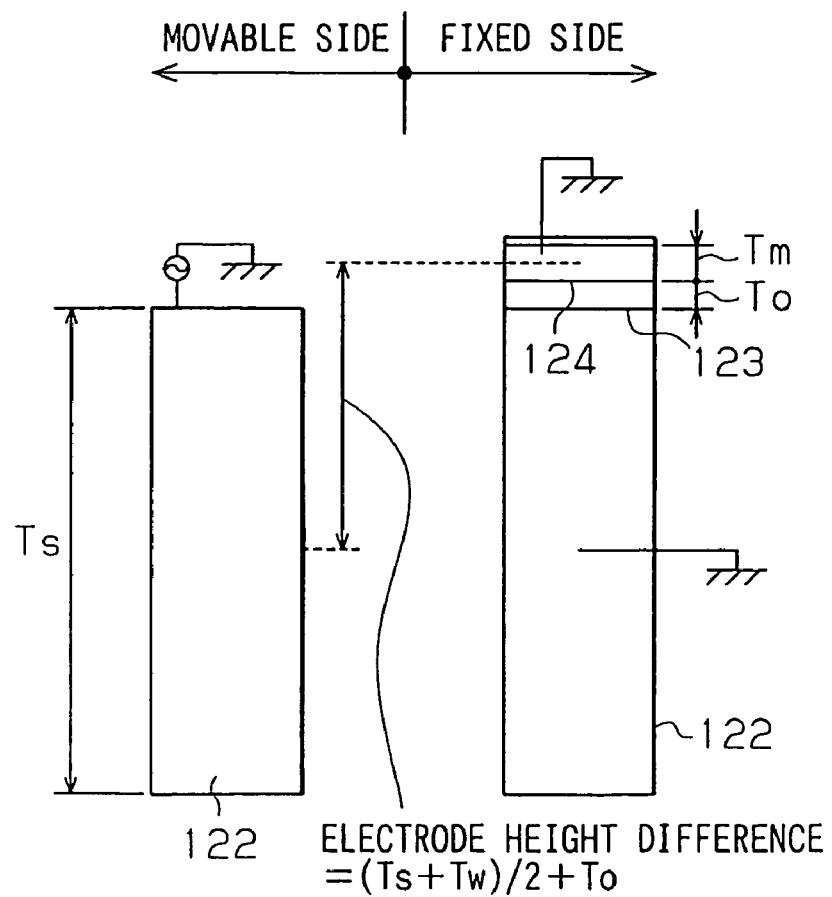
FIG. 37 is a view showing a positional relation between a movable side comb-tooth electrode and a fixed side comb-tooth electrode.

On the other hand, as shown in FIG. 37, in the case where the movable side comb-tooth electrode is constructed with the thin film silicon layer 122 of the laminate substrate, and the fixed side comb-tooth electrode 124 is formed on the thin film silicon layer 122 of the laminate substrate through the silicon oxide film 123, the following is obtained (the contents have been described before). When the thickness of the thin film silicon layer 122 is Ts=10 μm, the thickness of the silicon oxide film 123 is To=1 μm, and the thickness of the metal film 124 is Tm=1 μm, the electrode height difference becomes 6.5 μm.

As stated above, as compared with the structure of FIG. 37, according to the structure of FIGS. 6A-6B, the difference between the center position of the movable side comb-tooth electrode and the center position of the fixed side comb-tooth electrode in the vertical direction can be increased, and the swing (deflection angle) of the movable structure Em can be increased. Specifically, in the case where the size of the movable part (mirror part) 17 in length and breadth is made 1000 μm, the maximum displacement becomes $\tan^{-1}(15.25/500)=1.75°$, and the scan angle becomes twice the value, that is, 3.5°. This is large as compared with 1.5° of the case of FIG. 37.

Next, a manufacturing method will be described with reference to FIGS. 7A to 20C. In the respective drawings of FIGS. 7A to 20C, FIGS. 7A, 8A . . . correspond to FIG. 2, FIGS. 7B, 8B . . . corresponds to FIG. 3, and FIGS. 7C, 8C . . . corresponds to FIG. 4. That is, in the respective drawings of FIGS. 7A to 20C, FIGS. 7A, 8A . . . shows a manufacturing process at the line I-I of FIG. 1, FIGS. 7B, 8B . . . show the manufacturing process at the line III-III of FIG. 1, and FIGS. 7C, 8C . . . show the manufacturing process at the line IV-IV of FIG. 1.

Figure 7A:
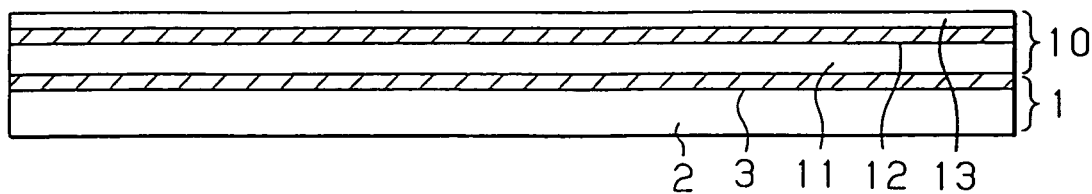
FIGS. 7A to 7C are longitudinal sectional views of an optical scanner for explaining a manufacturing process.
Figure 7B:
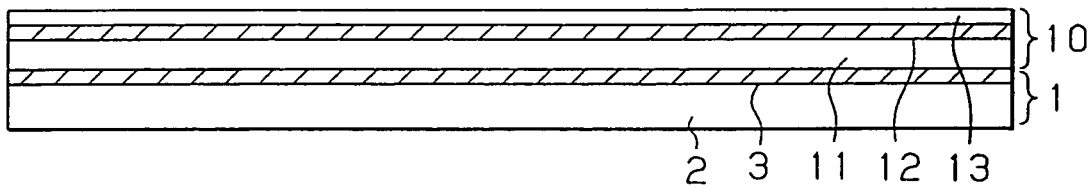
Figure 7C:
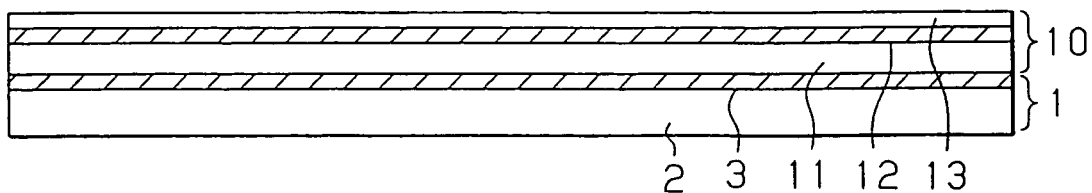

First, as shown in FIGS. 7A, 7B and 7C, what is obtained by disposing the laminate substrate 10 on the support substrate 1 is prepared. The support substrate 1 is constructed by forming the silicon oxide film 3 on the silicon substrate 2. The laminate substrate 10 is constructed by forming the thin film silicon layer 13 on the silicon substrate 11 through the buried oxide film 12.

Figure 21A:
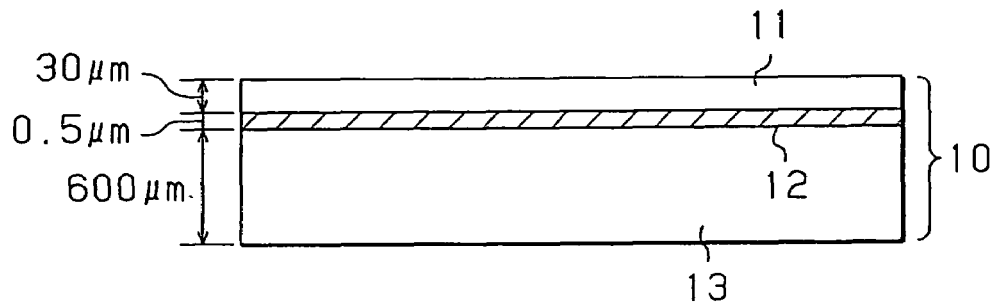
FIGS. 21A to 21D are longitudinal sectional views for explaining the manufacturing process.
Figure 21B:
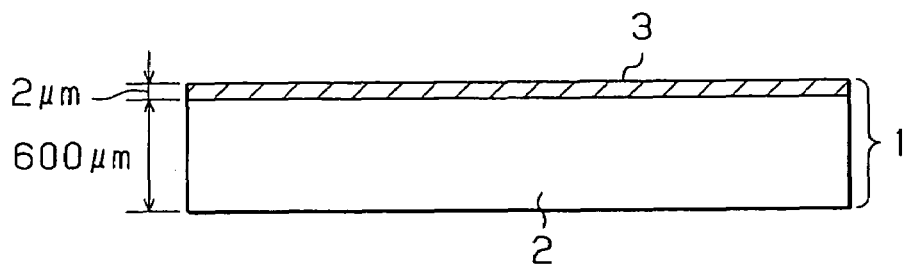
Figure 21C:
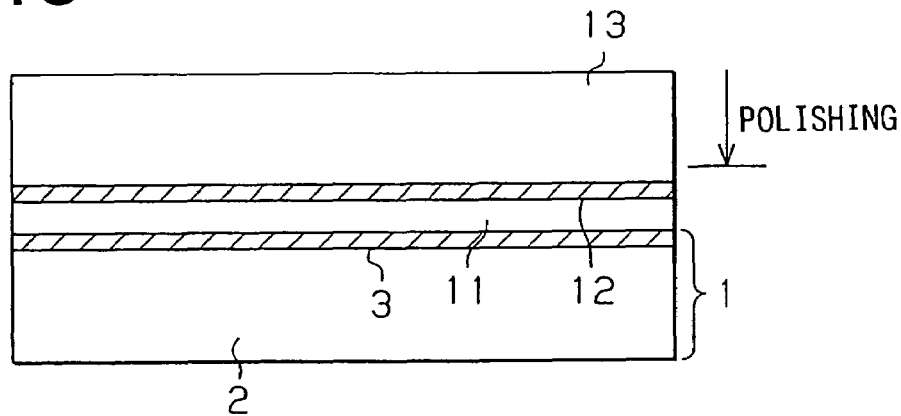
Figure 21D:
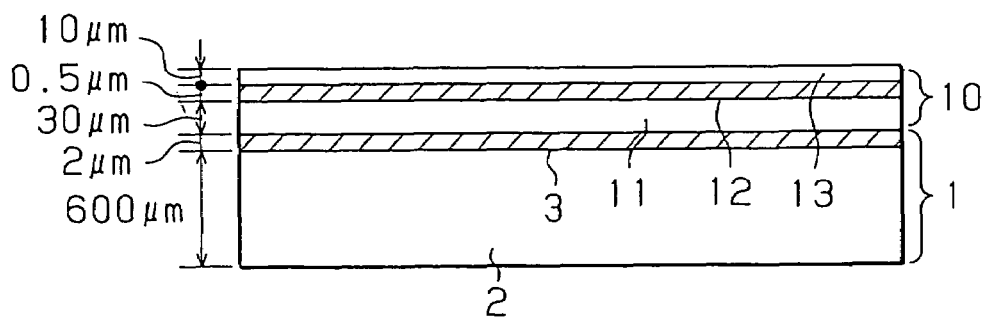

Particularly, as shown in FIG. 21A, what is obtained by forming the silicon substrate (silicon layer) 11 on the silicon layer 13 through the buried oxide film 12 is prepared. As shown in FIG. 21B, what is obtained by forming the silicon oxide film 3 on the silicon substrate 2 is prepared. Then, as shown in FIG. 21C, the silicon oxide film 3 and the silicon substrate (silicon layer) 11 are bonded to each other. Further, the silicon layer 13 is polished, and the silicon layer 13 is made thin. By this, as shown in FIG. 21D, what is obtained by disposing the laminate substrate 10 on the support substrate 1 is obtained.

Incidentally, in FIGS. 21A, 21B, 21C and 21D, specific film thickness values are indicated by way of example.

Figure 8A:
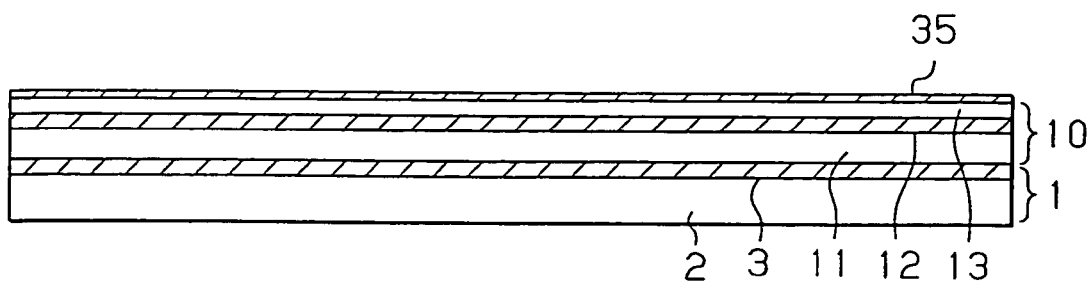
FIGS. 8A to 8C are longitudinal sectional views of the optical scanner for explaining the manufacturing process.
Figure 8B:
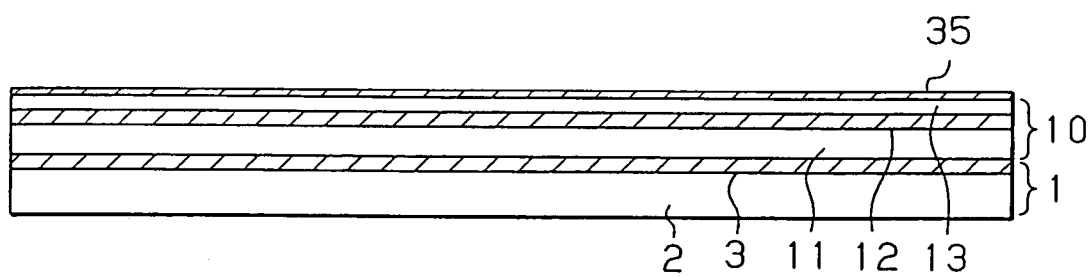
Figure 8C:
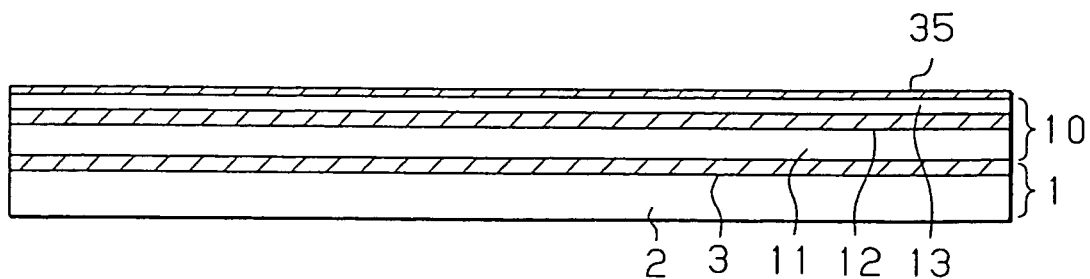

Next, as shown in FIGS. 8A, 8B and 8C, the silicon oxide film 35 is formed on the thin film silicon layer 13. Since the oxide film 35 becomes a mask member when the through hole (trench) bored through the thin film silicon layer 13, the buried oxide film 12, and the silicon substrate 11 is formed, a sufficient thickness is needed. For example, in the case where the buried oxide film 12 is a thermal oxidation film, its thickness is 0.5 μm, an etching selection ratio of single crystal silicon to the thermal oxidation film is 50, the thickness of the thin film silicon layer 13 is 10 μm, and the thickness of the silicon substrate 11 is 30 μm, when the trench is formed, the oxide film 35 formed here requires a thickness of (10+30)/50+0.5=1.3 μm or more. The formation of the oxide film 35 may be performed by either of CVD and CVD onto a thermal oxide film.

Figure 9A:
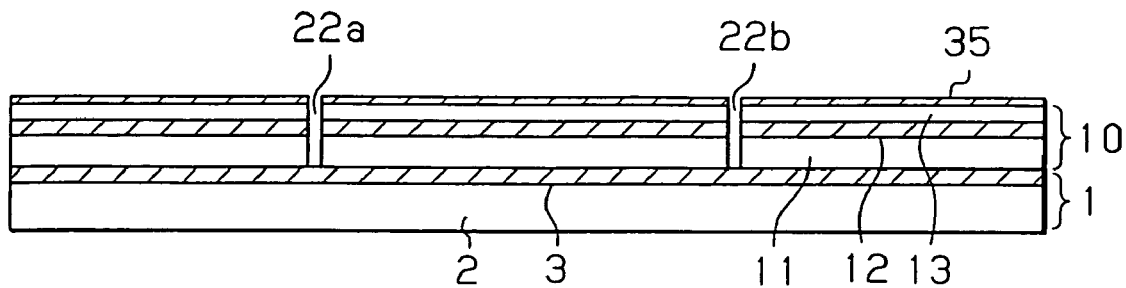
FIGS. 9A to 9C are longitudinal sectional views of the optical scanner for explaining the manufacturing process.
Figure 9B:
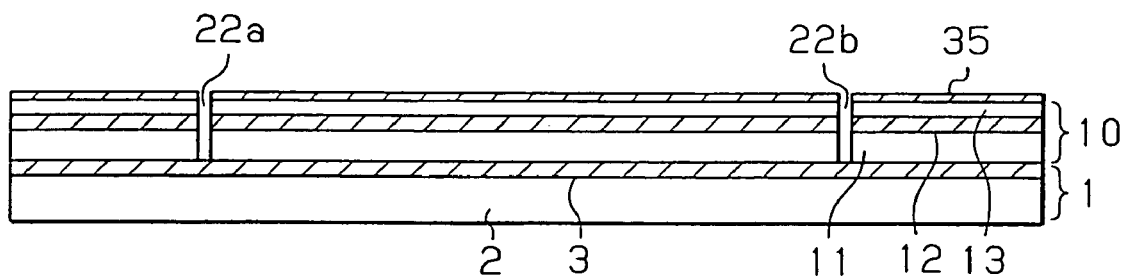
Figure 9C:
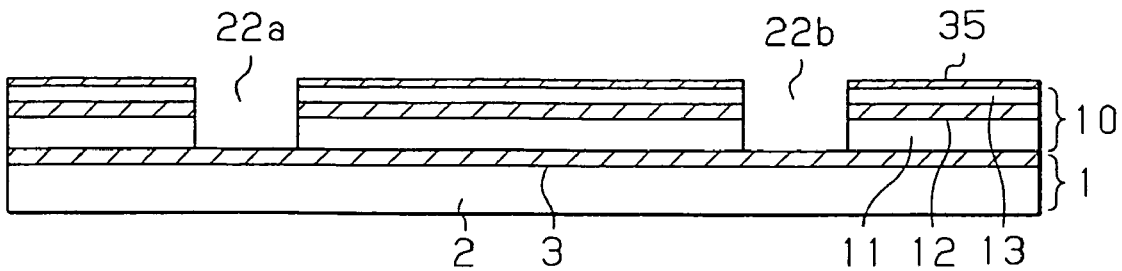

Subsequently, as shown in FIGS. 9A, 9B and 9C, in order to form a trench pattern on the silicon oxide film 35, the trench pattern of a resist is formed on the silicon oxide film 35, and the oxide film 35 in a specified area is etched using the resist as the mask. At this time, since the oxide film 35 is thick, in order to prevent deviation in pattern dimension due to etching in the lateral direction, an anisotropic dry etching is used. Then, after the resist is removed, the thin film silicon layer 13 (thickness is preferably 10 μm), the buried oxide film 12 (thickness is preferably 0.5 μm) and the silicon substrate 11 (thickness is preferably 30 μm) are etched in sequence to form the through holes (trenches) 22a and 22b. Here, a high aspect dry etching process generally called deep RIE is used. The widths of the through holes (trenches) 22a and 22b are about 3 μm.

Further, reaction products in the through holes (trenches) 22a and 22b are removed by using, for example, an HF solution of ⅕₀. Here, since water immersion for a long time etches the buried oxide film 12 in the horizontal direction, it is limited to a required minimum time.

In this way, the through holes (trenches) 22a and 22b bored through the laminate substrate 10 are formed in at least the formation area of the fixed side comb-tooth electrodes in the laminate substrate 10.

Figure 10A:
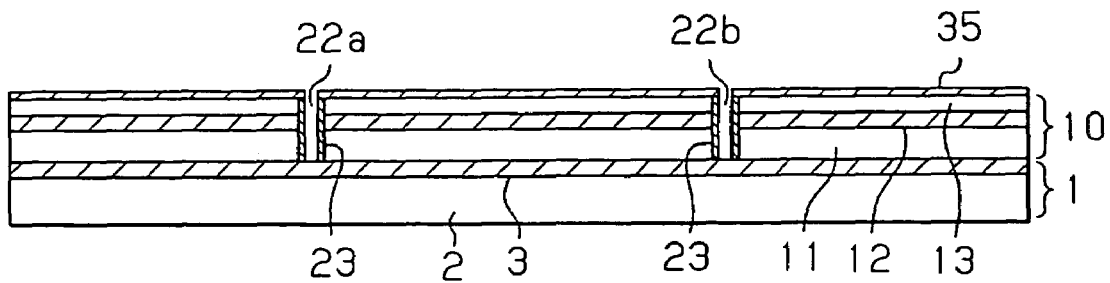
FIGS. 10A to 10C are longitudinal sectional views of the optical scanner for explaining the manufacturing process.
Figure 10B:
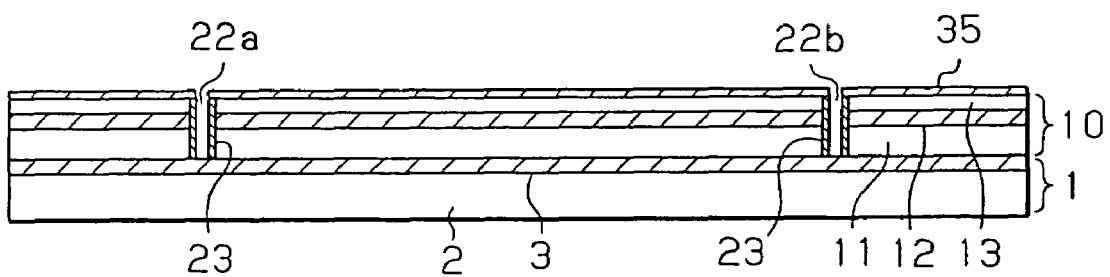
Figure 10C:
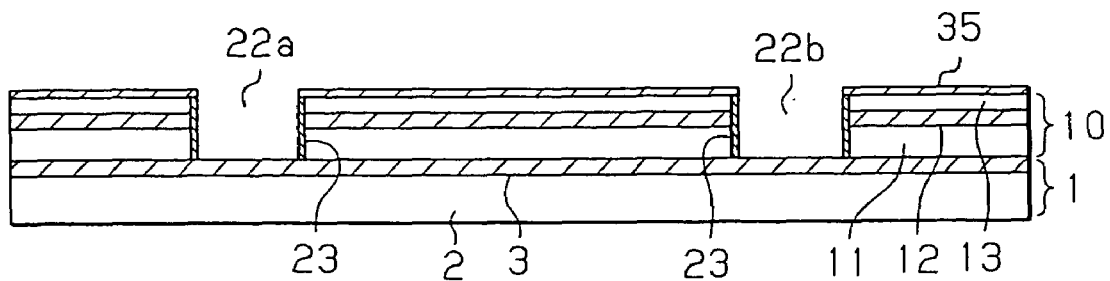
Figure 22A:
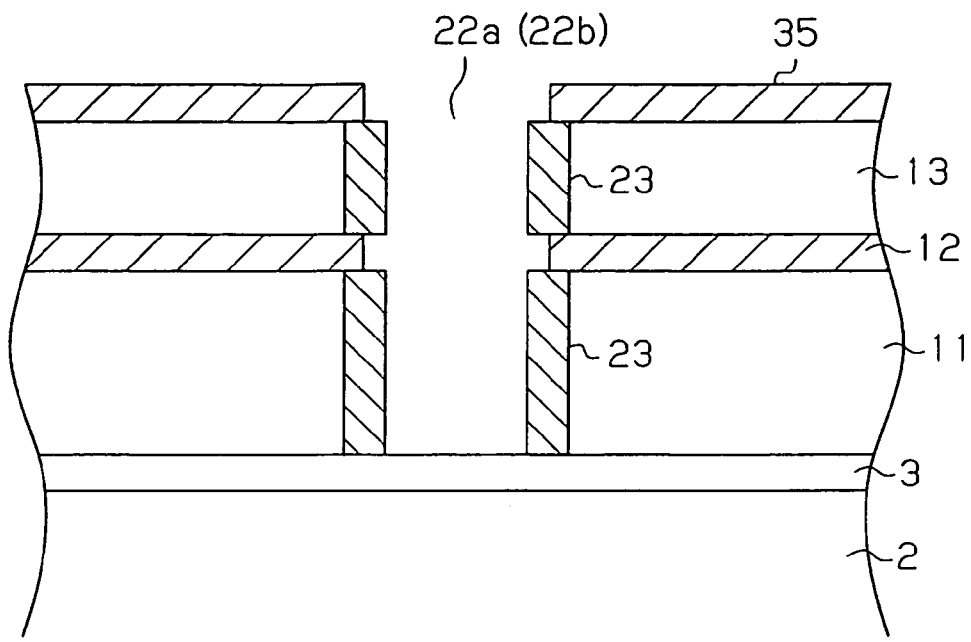
FIGS. 22A and 22B are longitudinal sectional views for explaining the manufacturing process.

Further, as shown in FIGS. 10A, 10B and 10C, thermal oxidation for about 0.1 μm is performed by, for example, wet oxidation at 1000° C. for one hour. By this, the silicon oxide films 23 by the thermal oxidation are formed on the trench sidewalls, and become stoppers at subsequent etching of the silicon substrate 11. At the formation of the silicon oxide films 23 by the thermal oxidation, as shown in FIG. 22A, the silicon oxide film (thermal oxidation film) 23 is not formed on the sidewall of the buried oxide film 12 in the through holes (trenches) 22a and 22b. Thus, in the through holes (trenches) 22a and 22b, the hole width at the side of the buried oxide film 12 becomes larger (wider) than the hole width at a part where the silicon oxide film (thermal oxide film) 23 is formed.

Figure 11A:
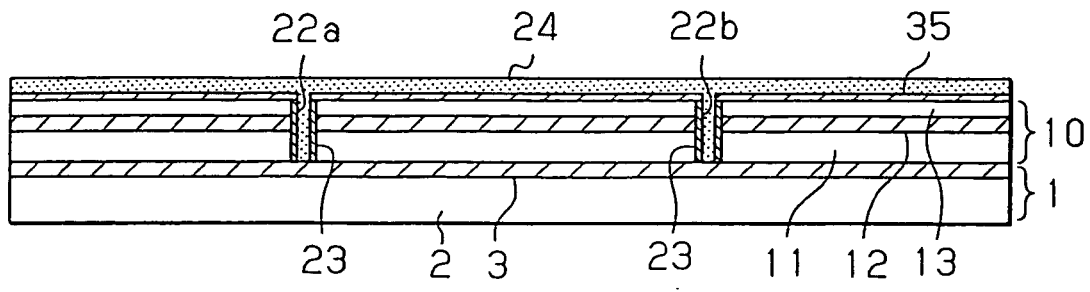
FIGS. 11A to 11c are longitudinal sectional views of the optical scanner for explaining the manufacturing process.
Figure 11B:
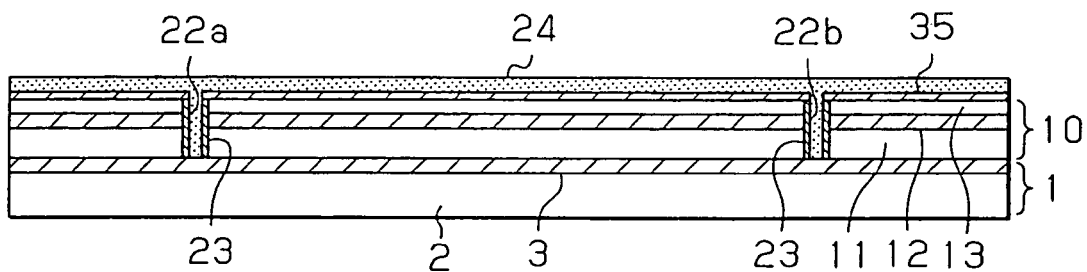
Figure 11C:
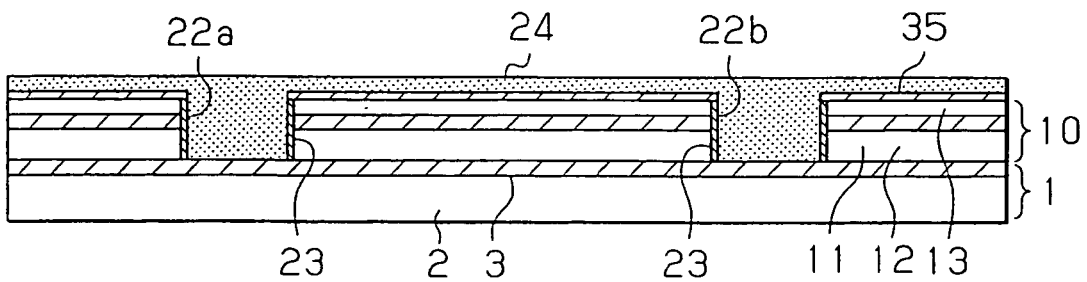
Figure 22B:
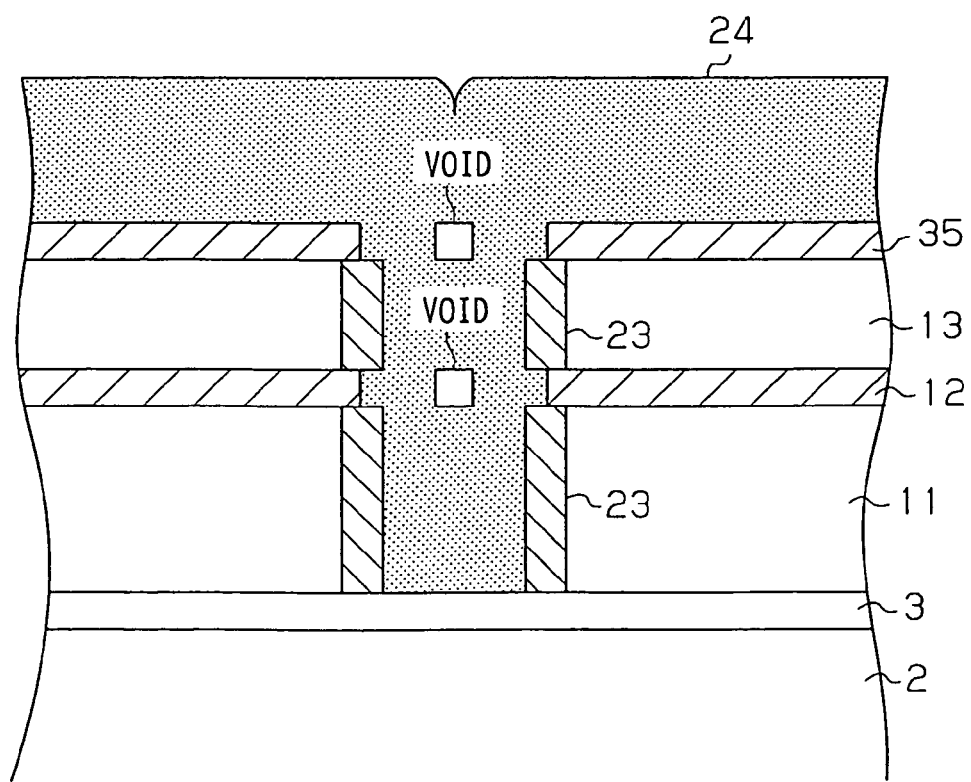

Then, as shown in FIGS. 11A, 11B and 11C, for the purpose of backfilling the through holes (trenches) 22a and 22b with conductive material, the polysilicon film 24 doped with, for example, phosphorous at a high concentration is formed by CVD. When the widths of the through holes (trenches) 22a and 22b are 3 μm, and when the polysilicon film 24 with a thickness of 3 μm is formed by the CVD, excellent embedding is obtained. At this time, since the formation of the excessive thermal oxide film (silicon oxide film 23) generates voids in the horizontal plane of the buried oxide film 12 at the time of backfilling, an optimum film thickness is needed. That is, as shown in FIG. 22A, when the silicon oxide film (thermal oxide film) 23 is excessively formed, at the time when the polysilicon film 24 is formed, voids are formed as shown in FIG. 22B, and accordingly, the excessive thermal oxidation is prevented from occurring. That is, since the voids decrease the strength of the comb-tooth electrode, the silicon oxide film (thermal oxide film) 23 at the trench sidewall is not made excessively thick.

Figure 12A:
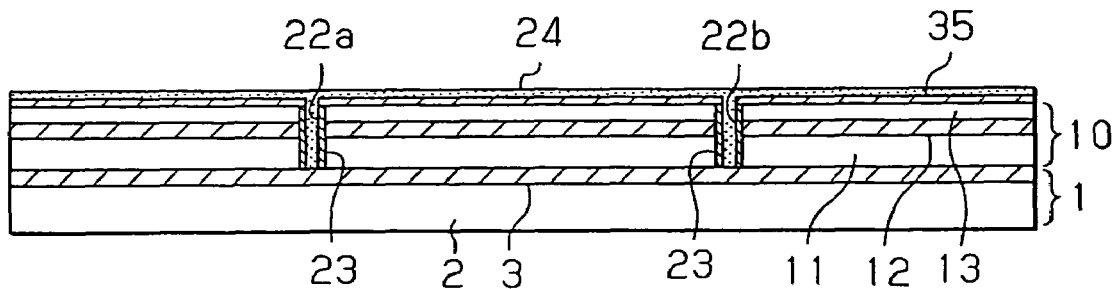
FIGS. 12A to 12C are longitudinal sectional views of the optical scanner for explaining the manufacturing process.
Figure 12B:
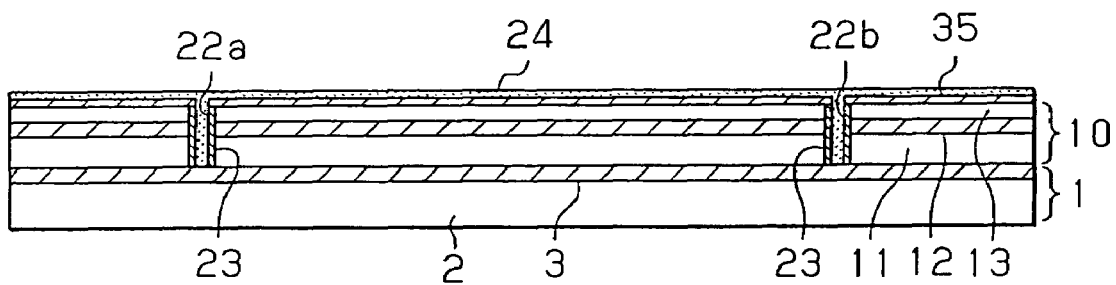
Figure 12C:
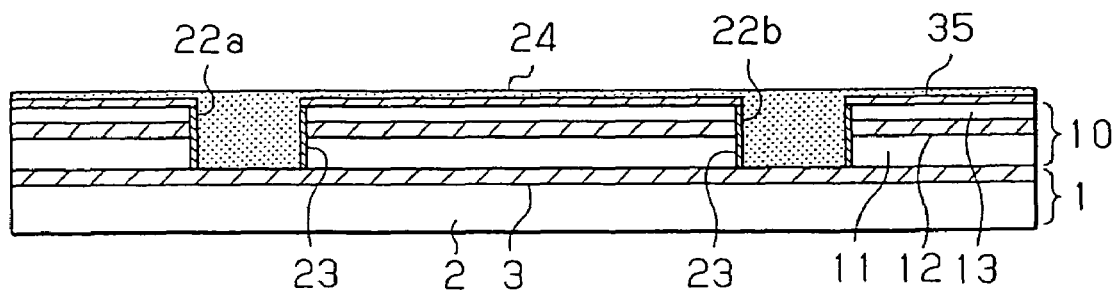

Subsequently, as shown in FIGS. 12A, 12B and 12C, the polysilicon film 24 deposited on the whole surface of the wafer surface is etched by 2 μm without a mask, and the thickness of the remaining film of the polysilicon film 24 is made approximately 1 μm.

Figure 13A:
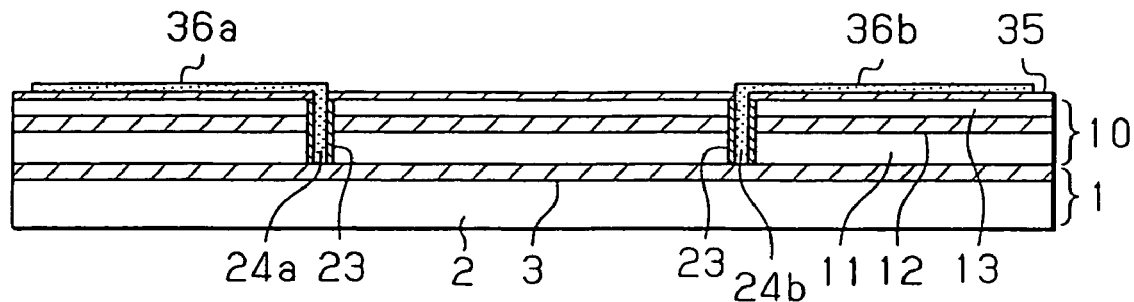
FIGS. 13A to 13C are longitudinal sectional views of the optical scanner for explaining the manufacturing process.
Figure 13B:
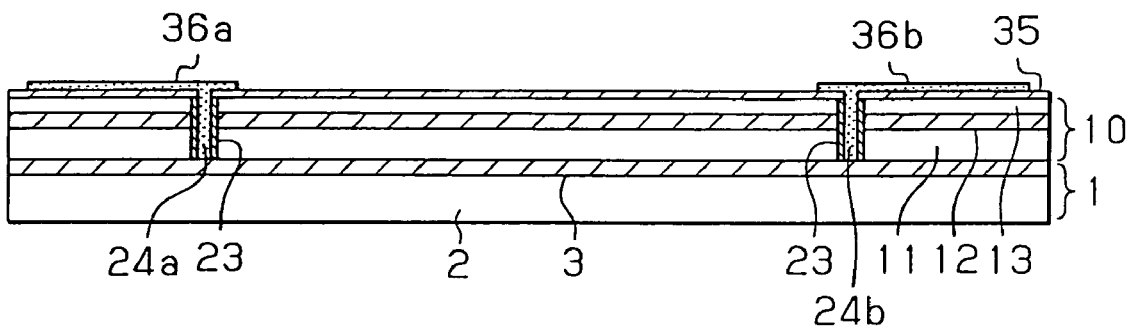
Figure 13C:
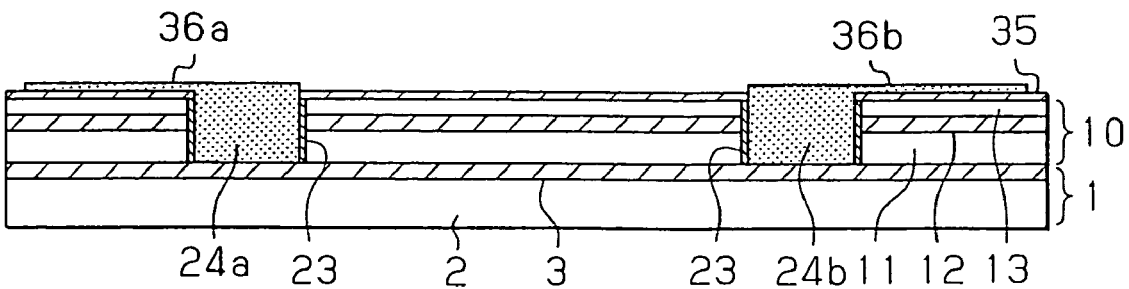

Then, as shown in FIGS. 13A, 13B and 13C, the polysilicon film in an unnecessary area is removed by etching, and the polysilicon films 36a and 36b as wirings are made to remain. The polysilicon films 36a and 36b as the wirings connect the fixed side comb-tooth electrodes 25a and 25b and the pads 37a and 37b (see FIGS. 2 and 4).

Figure 14A:
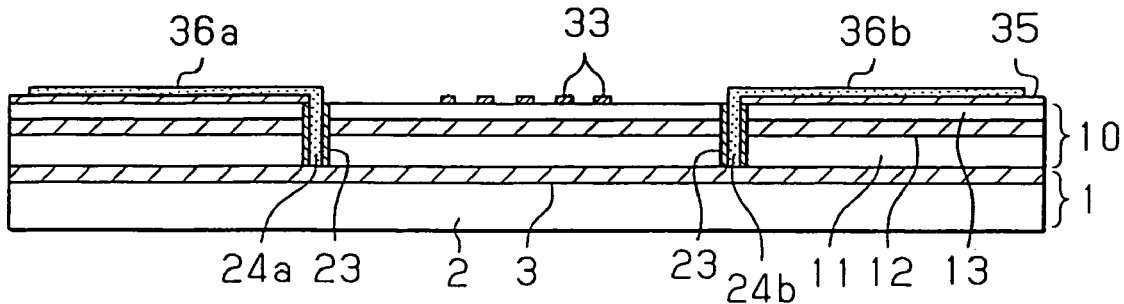
FIGS. 14A to 14C are longitudinal sectional views of the optical scanner for explaining the manufacturing process.
Figure 14B:
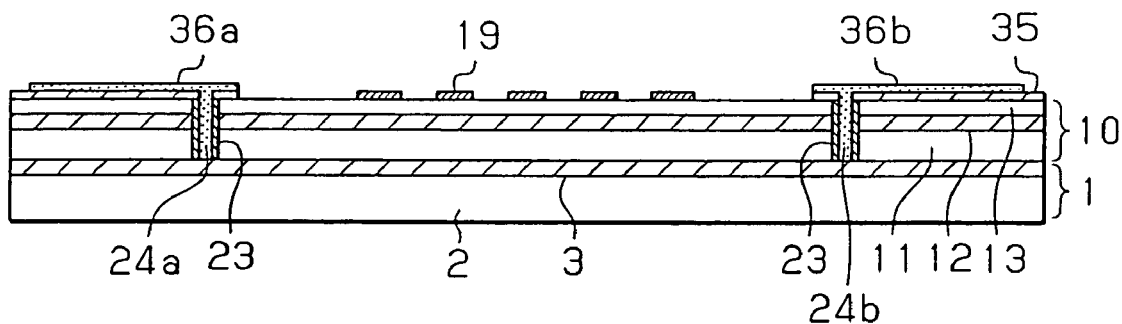
Figure 14C:
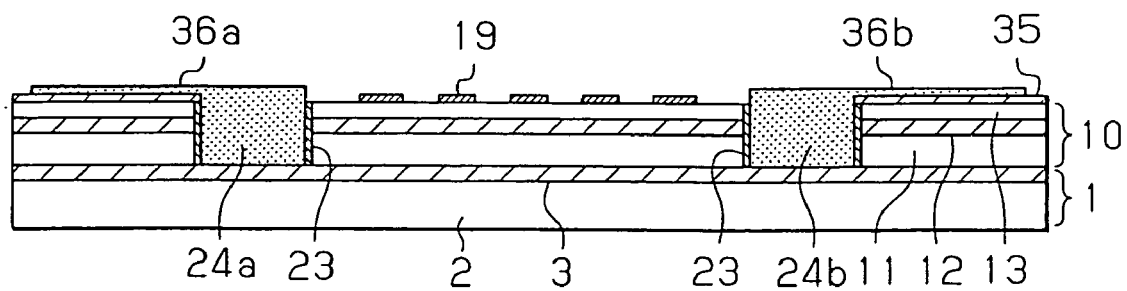

Next, as shown in FIGS. 14A, 14B and 14C, the contact area in the silicon oxide film 35 is patterned (etching removal) to form the oxide films 19 and 33.

Figure 15A:
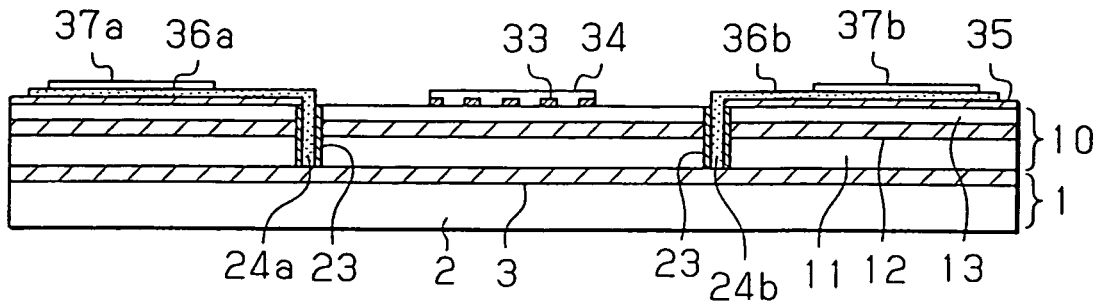
FIGS. 15A to 15C are longitudinal sectional views of the optical scanner for explaining the manufacturing process.
Figure 15B:
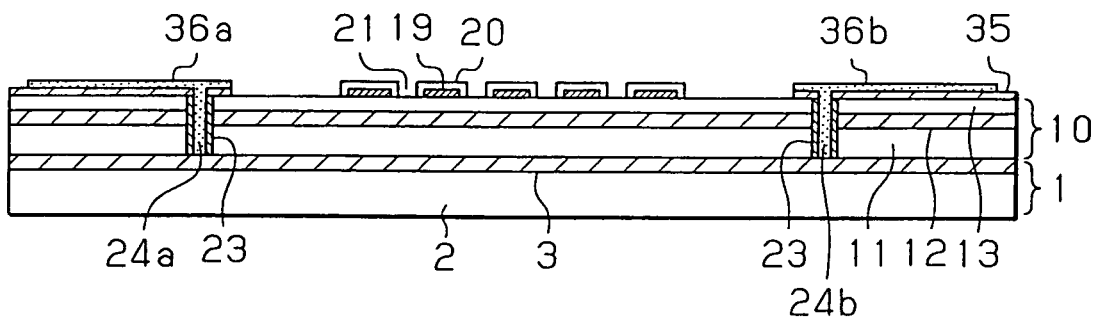
Figure 15C:
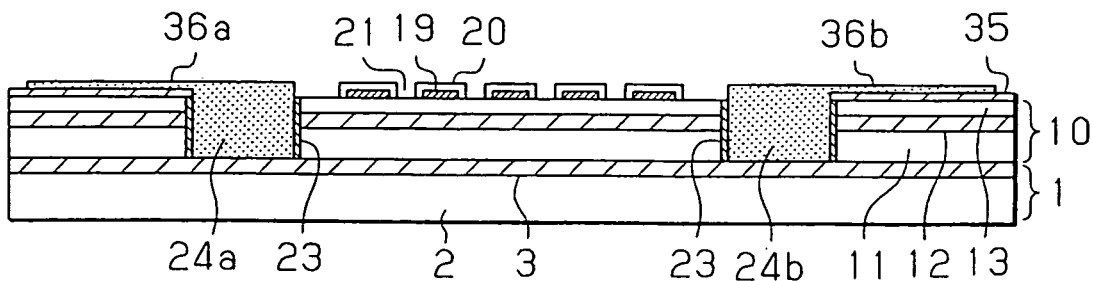

Then, as shown in FIGS. 15A, 15B and 15C, a metal film (aluminum film) is deposited or sputtered, and is further patterned (etched) to form the reflection film 20, the pads 37a, 37b and 34 and the pads 38a and 38b (see FIG. 1). At this time, many openings (transmission holes 21) are formed in the formation portion of the reflection film 20. Each of the openings (transmission holes 21) has a square shape with a dimension of 3 μm in length and breadth, and the interval (pitch) is 180 μm. The metal film may be made of AlSiCu, gold or the like in addition to aluminum.

Figure 16A:
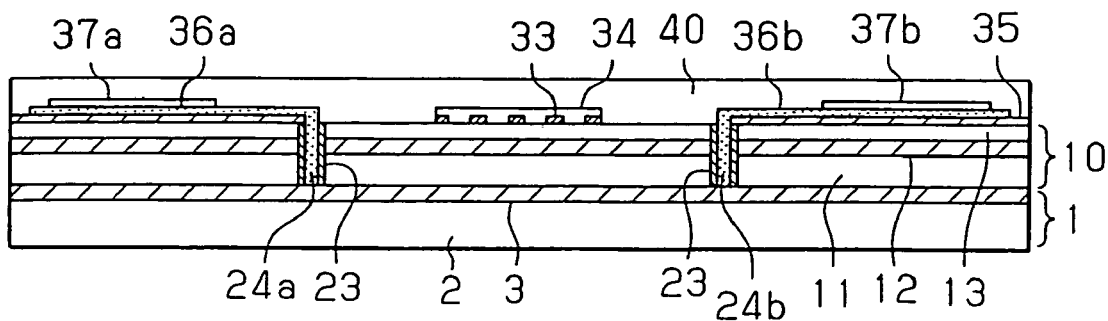
FIGS. 16A to 16C are longitudinal sectional views of the optical scanner for explaining the manufacturing process.
Figure 16B:
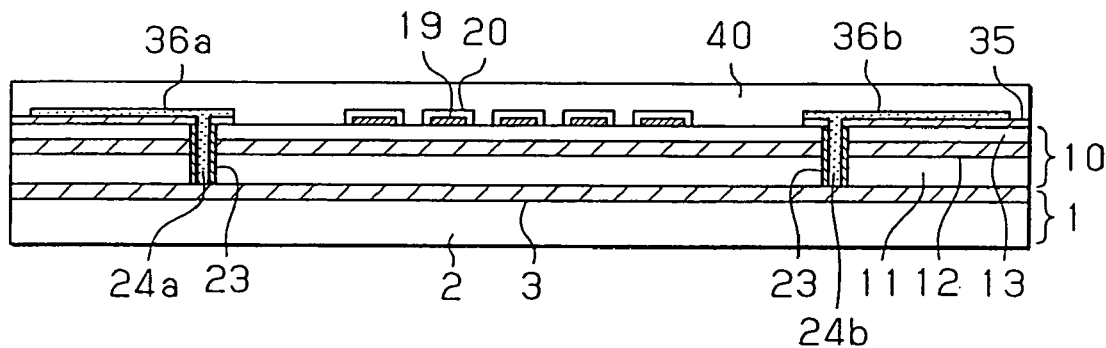
Figure 16C:
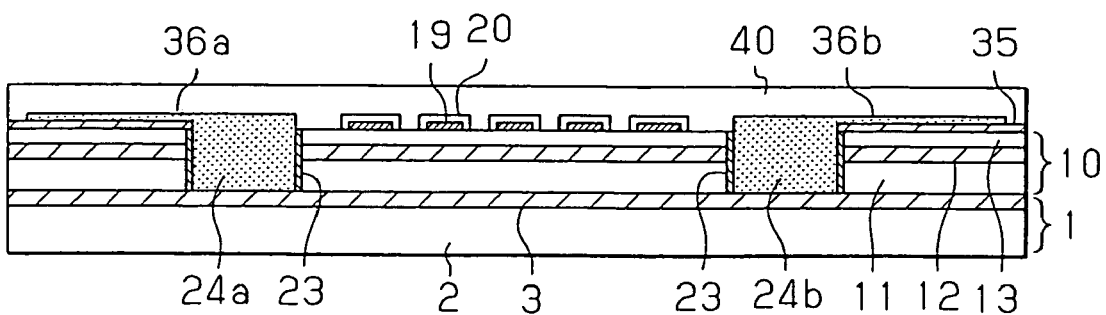
Figure 17A:
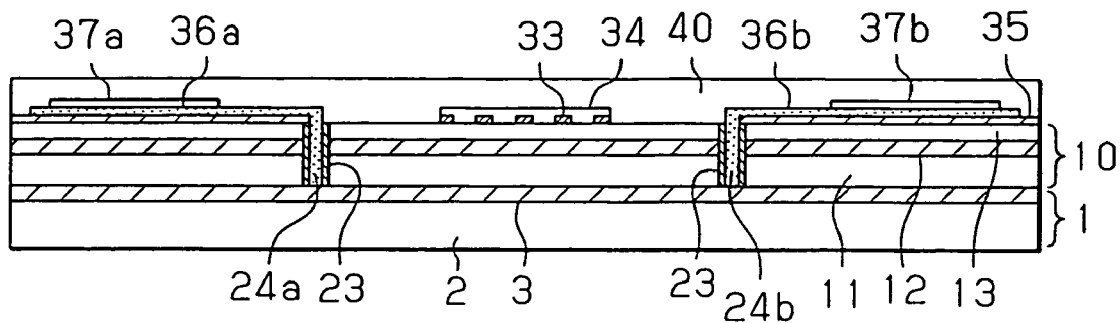
FIGS. 17A to 17C are longitudinal sectional views of the optical scanner for explaining the manufacturing process.
Figure 17B:
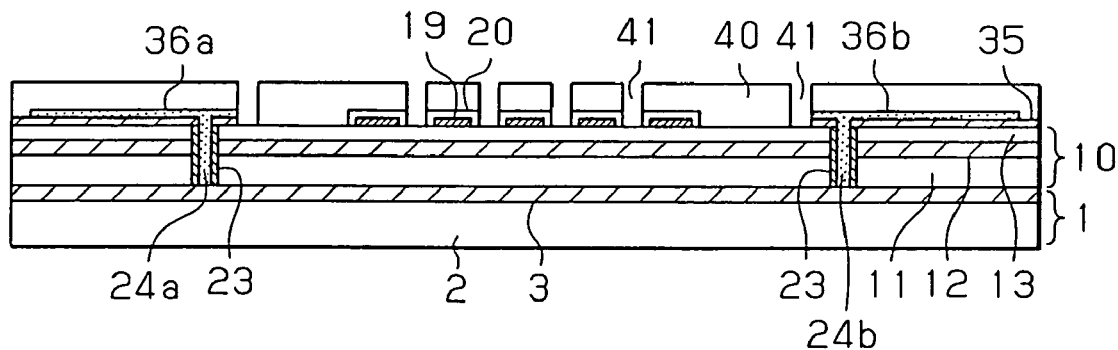
Figure 17C:
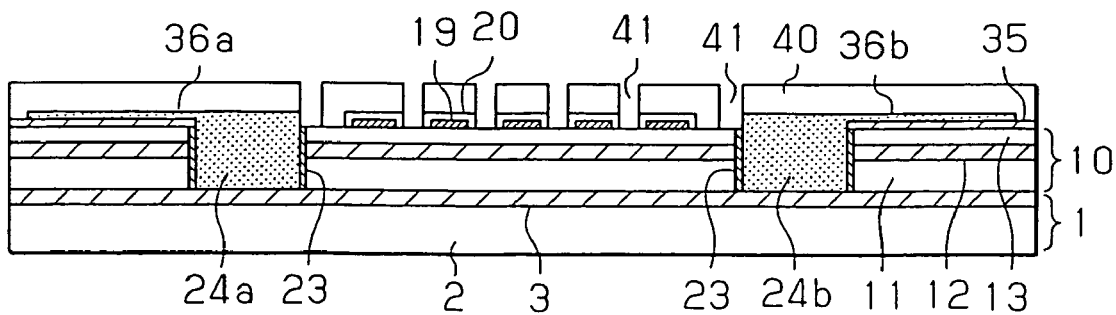

Further, as shown in FIGS. 16A, 16B and 16C, a silicon oxide film 40 of about 2 μm is deposited by low temperature CVD such as plasma TEOS, and an annealing processing at 450° C. for about 30 minutes is performed. Then, as shown in FIGS. 17A, 17B and 17C, in order to form the pattern of the through hole 15 and the pattern of the transmission holes 21 of FIG. 1 in the silicon oxide film 40, a trench pattern of a resist is formed on the silicon oxide film 40, and the oxide film 40 of a specified area is etched using the resist as a mask. By this manner, openings 41 are formed.

Figure 18A:
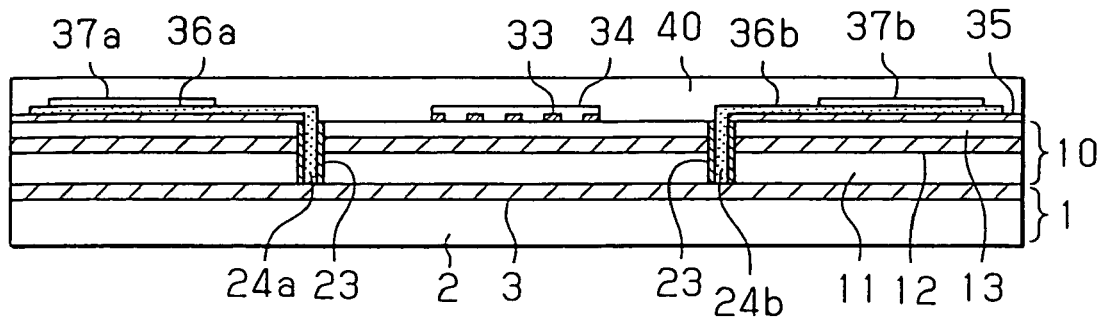
FIGS. 18A to 18C are longitudinal sectional views of the optical scanner for explaining the manufacturing process.
Figure 18B:
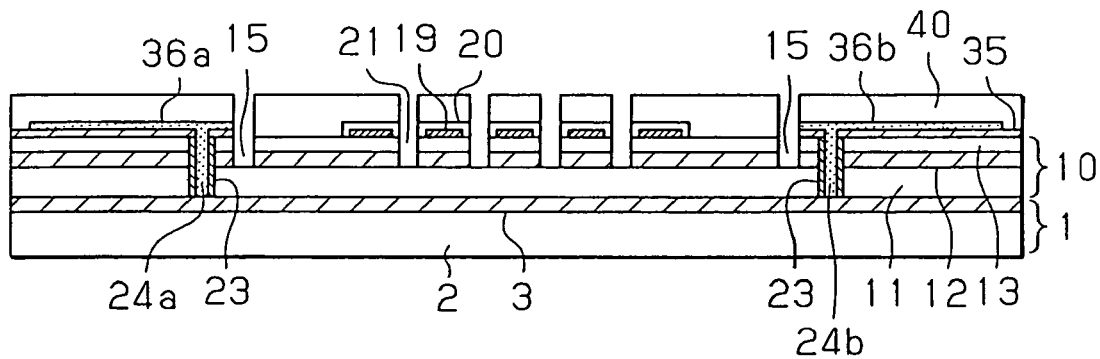
Figure 18C:
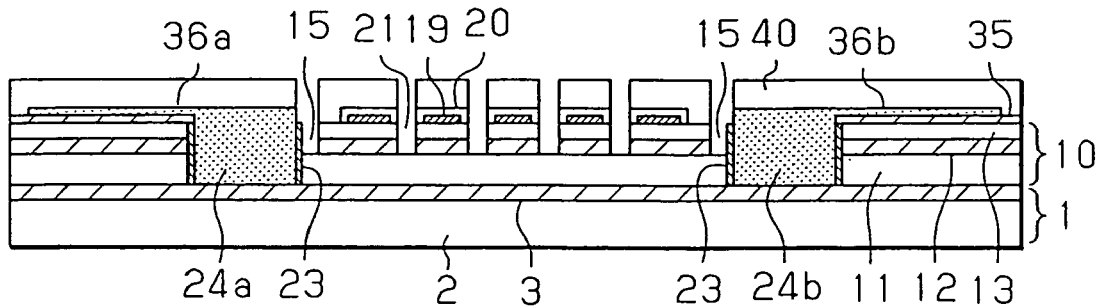

Subsequently, as shown in FIGS. 18A, 18B and 18C, after the resist is removed, the thin film silicon layer 13 is etched by dry etching using the silicon oxide film 40 as a mask, and subsequently, the exposed buried oxide film 12 is removed by using the dry etching. By this, the through hole (trench) 15 and the transmission holes 21 are formed. At this time, since the etching rate of the buried oxide film 12 at the bottom of the trench is low due to a macroloading effect, it is necessary to make an etching time sufficient. Accordingly, the silicon oxide film (TEOS film) 40 must be sufficiently thick in terms of the etching rate ratio to the silicon oxide film (mask oxide film) 40, or the openings (the openings 41 of FIGS. 17A to 17C) must be wide in order to suppress the microloading effect.

In this way, at least the thin film silicon layer 13 and the buried oxide film 12 around the formation area of the movable structure in the laminate substrate 10 are removed by trench etching (at least the through hole 15 is formed).

Figure 19A:
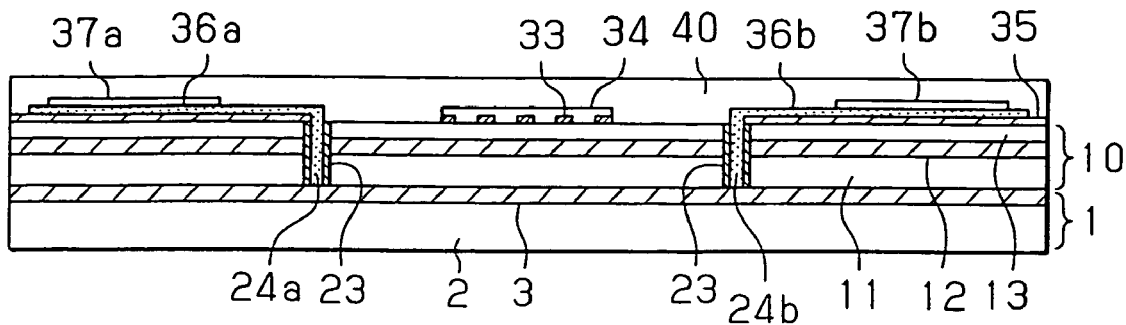
FIGS. 19A to 19C are longitudinal sectional views of the optical scanner for explaining the manufacturing process.
Figure 19B:
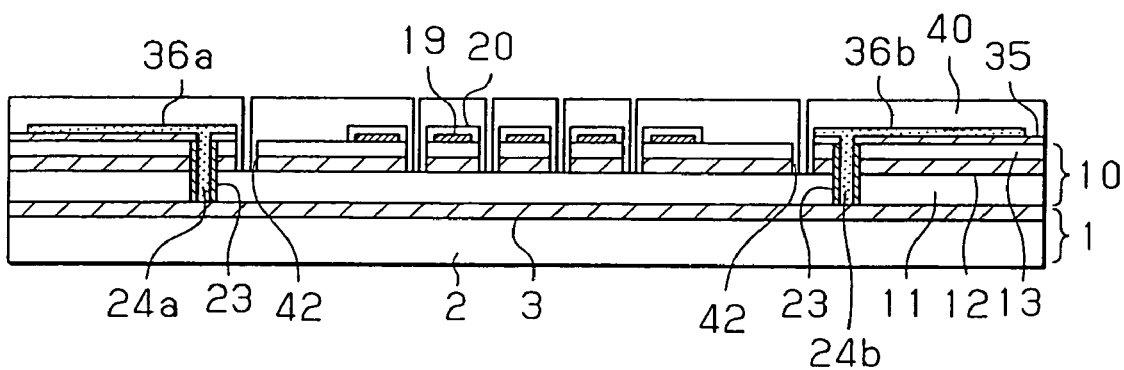
Figure 19C:
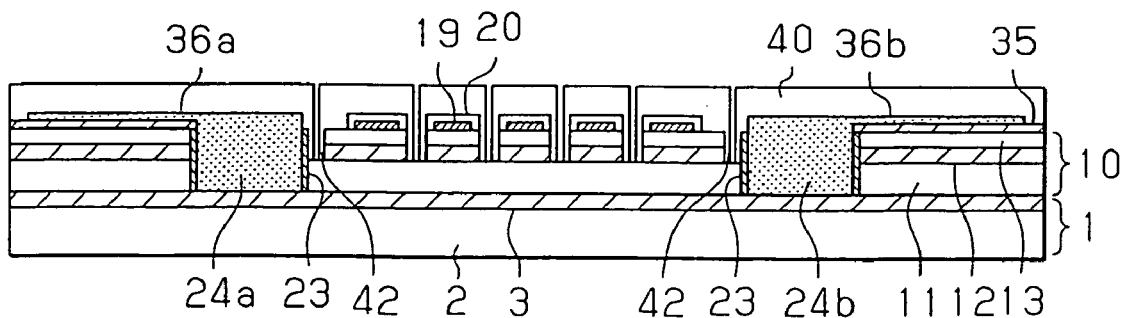

Next, as shown in FIGS. 19A, 19B and 19C, a silicon oxide film 42 of about 0.3 μm is deposited by CVD, and the whole surface is removed by dry etching by the thickness of the deposition. By this, the thin silicon oxide film 42 is formed only on the sidewalls of the through hole (trench) 15 and the transmission holes 21 formed in FIGS. 18A to 18C.

Figure 20A:
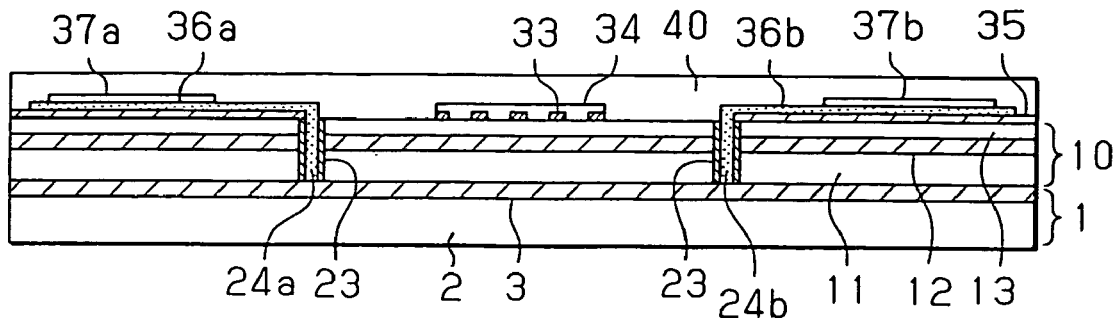
FIGS. 20A to 20C are longitudinal sectional views of the optical scanner for explaining the manufacturing process.
Figure 20B:
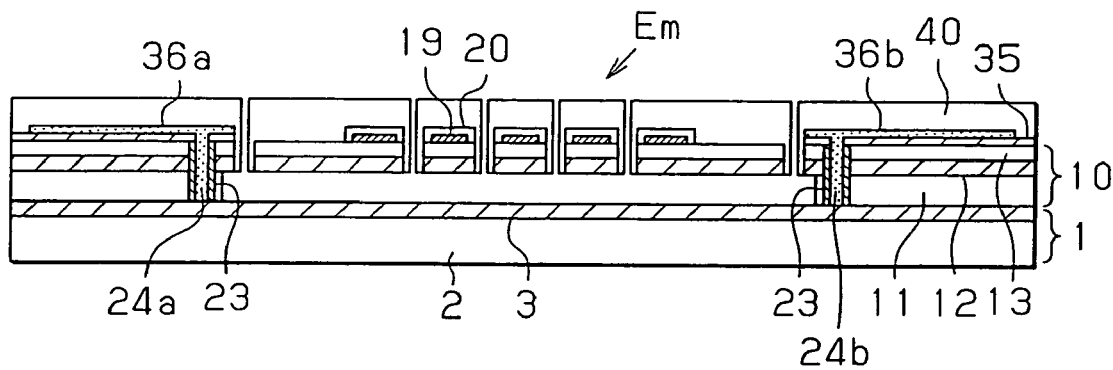
Figure 20C:
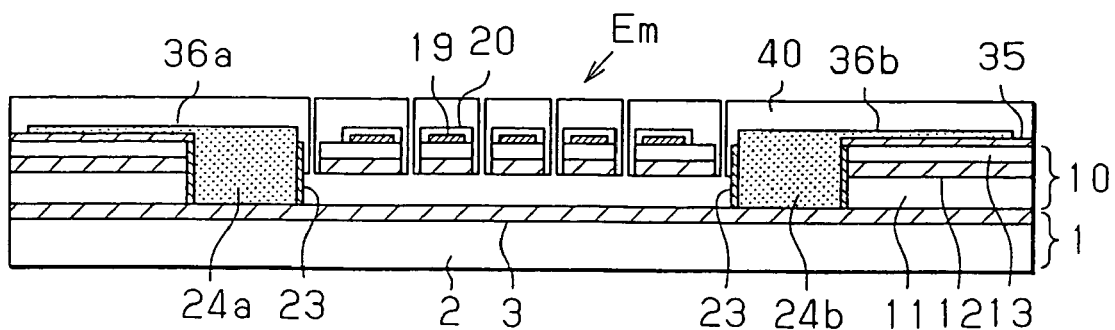

Further, as shown in FIGS. 20A, 20B and 20C, the silicon substrate 11 under the area which becomes the movable structure Em is removed by etching using an isotropic etching material such as, for example, $XeF_2$. The etching gas enters from the trenches (portions denoted by reference numerals 15 and 21) formed in FIGS. 18A to 18C, and the etching amount is adjusted so that the movable structure Em is completely separated from the oxide film 3. Here, in the etching using the $XeF_2$ gas, the oxide film has a very high selection ratio to Si, and the oxide film 23 formed at the trench sidewall and the buried oxide film 12 of the rear surface of the movable structure Em become etching stoppers.

Finally, the oxide films 23 and 12 used as the etching stoppers and the whole silicon oxide film 40 are removed by dry etching to expose the aluminum surface, and the structure shown in FIGS. 2, 3 and 4 is obtained.

As stated above, the structure is made such that the movable side comb-tooth electrodes 18a and 18b constructed with the thin film silicon layer 13 of the laminate substrate 10 and the fixed side comb-tooth electrodes 25a and 25b constructed with the polysilicon film (conductive material) formed in the through hole 15 of the laminate substrate 10 are disposed to face each other. That is, for the purpose of forming the fixed side comb-tooth electrodes 25a and 25b, the trench etching is performed, and the conductive material (polysilicon film) is filled in the trench, and the fixed side comb-tooth electrodes 25a and 25b are constructed with this.

Here, from the viewpoint of an aspect ratio in the trench etching, the height difference between the movable side comb-tooth electrode and the fixed side comb-tooth electrode will be described.

The heights of the fixed side comb-tooth electrodes 25a and 25b are determined by the depth of the trench etching. For example, in the case where the etching condition of the aspect ratio of 60 is used, when the width of each tooth of the comb-tooth electrodes is made 3 μm, the depth of the trench becomes 180 μm. Accordingly, in the case where the thickness of the thin film silicon layer 13 at the movable part 17 (mirror surface) is made 10 μm, the height difference between the movable side comb-tooth electrode and the fixed side comb-tooth electrode becomes (180/2)−(10/2)=85 μm. Accordingly, from the same calculation as the calculation in the description of the related art, a scan angle is 19.3° (=2·{$\tan^{-1}(85/500)$}), and the scan angle twelve times as large as 1.5° of the related art can be obtained.

During the manufacturing process, when the sidewall is subject to thermal oxidation after the trench is formed, the polysilicon can be surrounded by the oxide film 23, and it is made a protection film of the fixed side comb-tooth electrode (polysilicon) at the time of etching of silicon in the formation process of the under space of the movable structure Em.

As stated above, there are following features as the manufacturing method of the electrostatic actuator.

(A) As a first step, as shown in FIGS. 7A to 7C, the laminate substrate 10 is disposed on the support substrate 1. As a second step, as shown in FIGS. 9A to 9C and 11A to 11C, the through holes 22a and 22b bored through the laminate substrate 10 are formed in the formation areas of the fixed side comb-tooth electrodes in the laminate substrate 10, and the polysilicon films 24 as the conductive material, which become the fixed side comb-tooth electrodes, are filled in the through holes 22a and 22b. As a third step, as shown in FIGS. 18A to 18C, the thin film silicon layer 13 and the buried oxide film 12 around the formation area of the movable structure in the laminate substrate 10 are removed by the trench etching. As a fourth step, as shown in FIGS. 20A to 20C, the silicon substrate 11 in the formation area of the movable structure is removed by etching.

(B) As a first step, as shown in FIGS. 7A to 7C, the laminate substrate 10 is disposed on the support substrate 1. As a second step, as shown in FIGS. 9A to 9C, 10A to 10C and 11A to 11C, the through holes 22a and 22b bored through the laminate substrate 10 are formed in the formation areas of the fixed side comb-tooth electrodes in the laminate substrate 10, the silicon oxide films (thermal oxidation films) 23 as the protection films are formed on the sidewalls of the through holes 22a and 22b, and the polysilicon films 24 as the conductive material, which become the fixed side comb-tooth electrodes, are filled in the inside. As a third step, as shown in FIGS. 18A to 18C, the thin film silicon layer 13 and the buried oxide film 12 around the formation area of the movable structure in the laminate substrate 10 are removed by the trench etching. As a fourth step, as shown in FIGS. 20A to 20C, the silicon substrate 11 in the formation area of the movable structure is removed by the etching using the silicon oxide films 23 of the protection films as the etching stoppers. Thus, the silicon oxide films 23 of the protection films are used as the etching stoppers, so that the conductive material, which becomes the fixed side comb-tooth electrodes, is protected against the etching.

Hereinafter, applied examples will be described.

In FIG. 1, although the fixed side comb-tooth electrodes 25a and 25b are made of polysilicon, metal may be used. Specifically, copper and titanium can be listed as the metal.

As shown in FIG. 2, the support substrate 1 is obtained by forming the silicon oxide film 3 on the silicon substrate. However, a glass plate or a ceramic plate may be used as the support substrate 1.

Further, although the fixed side comb-tooth electrode 25a, 25b of FIG. 1 and the pad 37a, 37b are electrically connected to each other through the polysilicon film 36a, 36b, the fixed side comb-tooth electrode 25a, 25b and the pad 37a, 37b may be electrically connected to each other by using a metal film.

Figure 23:
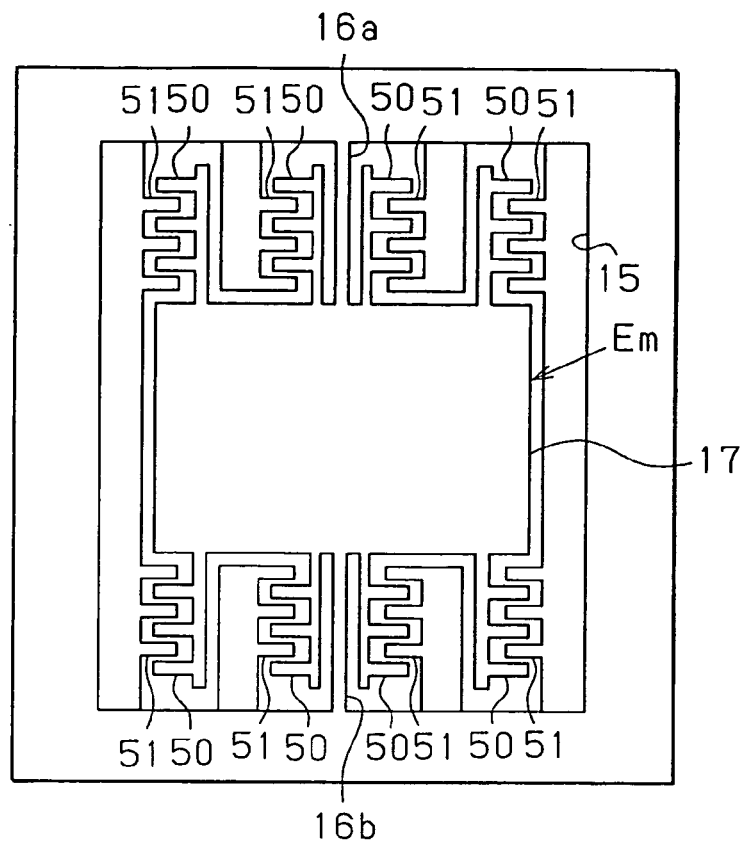
FIG. 23 is a plan view of an exemplary optical scanner.
Figure 24:
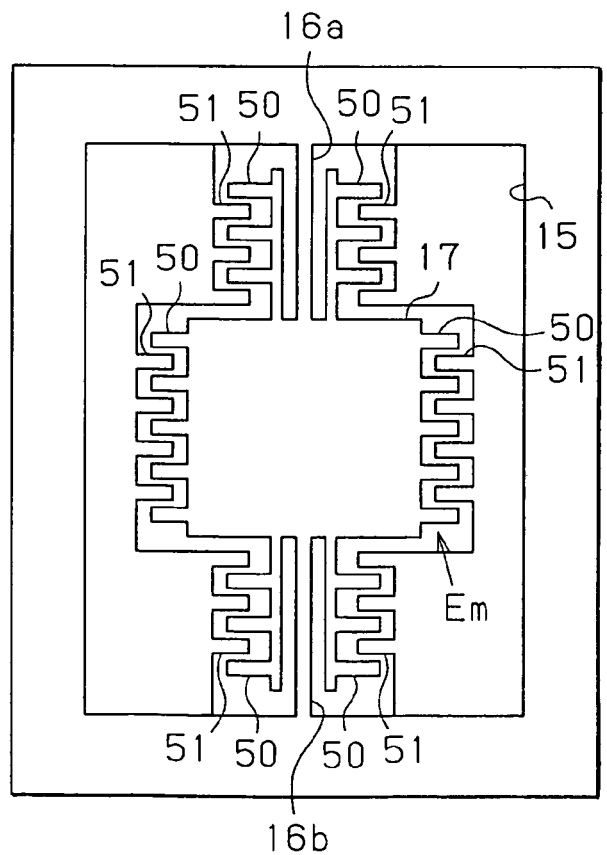
FIG. 24 is a plan view of an exemplary optical scanner.
Figure 25:
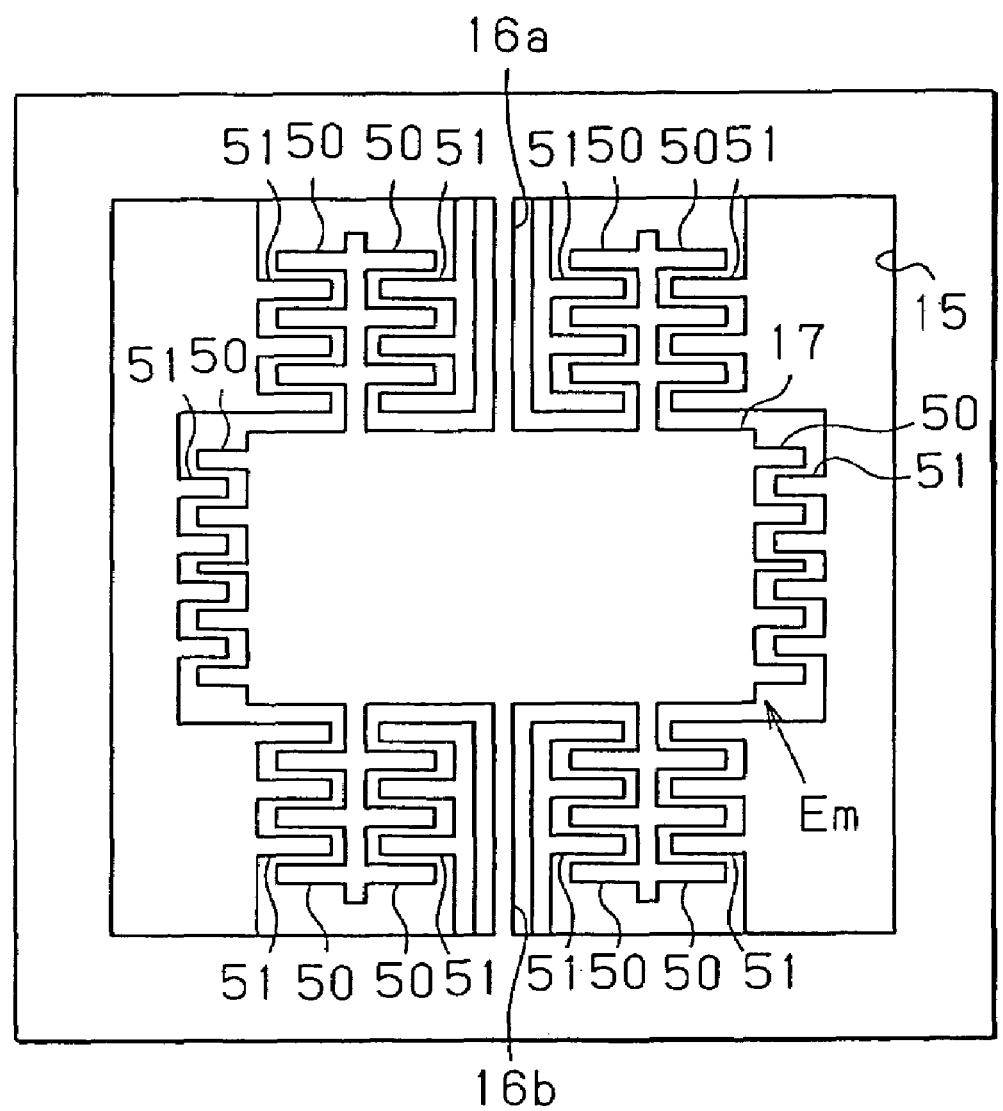
FIG. 25 is a plan view of an exemplary optical scanner.

Rather than the embodiment shown in FIG. 1, three or more pairs of movable side and fixed side comb-tooth electrodes 50 and 51 may be provided as shown in FIGS. 23, 24 and 25. That is, in FIG. 1, although the two pairs of the movable side and fixed side comb-tooth electrodes (18a, 18b, 25a, 25b) are provided, eight pairs as shown in FIG. 23, six pairs as shown in FIG. 24, or ten pairs as shown in FIG. 25 may be provided.

Particularly, in FIG. 23, the movable side comb-tooth electrodes 50 are provided at sides (two sides facing each other) where torsion beams 16a and 16b are provided in a rectangular movable part 17. Further, in FIGS. 24 and 25, the movable side comb-tooth electrodes 50 are provided at sides where torsion beams 16a and 16b are provided in a rectangular movable part 17 and sides where torsion beams 16a and 16b are not provided.

As stated above, as compared with the structure of FIG. 1, as shown in FIGS. 23, 24 and 25, by increasing the number of the comb-tooth electrodes, the electrostatic force by the potential difference between the movable side comb-tooth electrode and the fixed side comb-tooth electrode is increased, and driving (swing operation) at a low voltage becomes possible.

In FIG. 1, the movable side comb-tooth electrodes 18a and 18b are provided at the sides where the torsion beams 16a and 16b are not provided in the rectangular movable part 17. On the other hand, in FIG. 23, the movable side comb-tooth electrodes 50 are provided at the sides where the torsion beams 16a and 16b are provided in the rectangular movable part 17. By this, it becomes possible to decrease a displacement amount of the comb-tooth electrode to a deflection angle and to increase the deflection angle.

Figure 26:
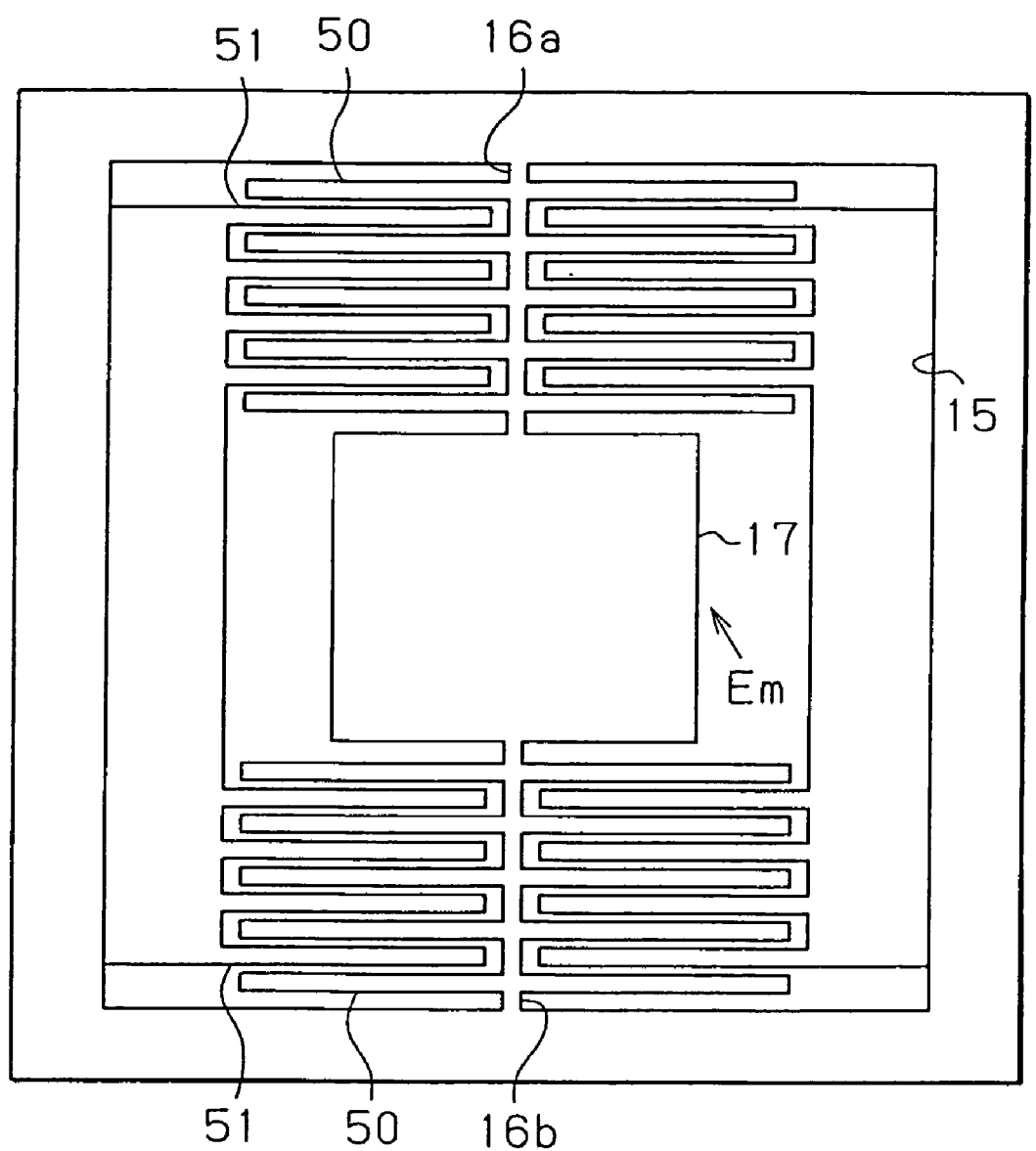
FIG. 26 is a plan view of an exemplary optical scanner.

Rather than the embodiment shown in FIG. 1, movable side comb-tooth electrodes 50 may be provided at torsion beams 16a and 16b of a movable structure Em as shown in FIG. 26. By this, it becomes possible to decrease a displacement amount of the comb-tooth electrode to a deflection angle and to increase the deflection angle.

Figure 27:
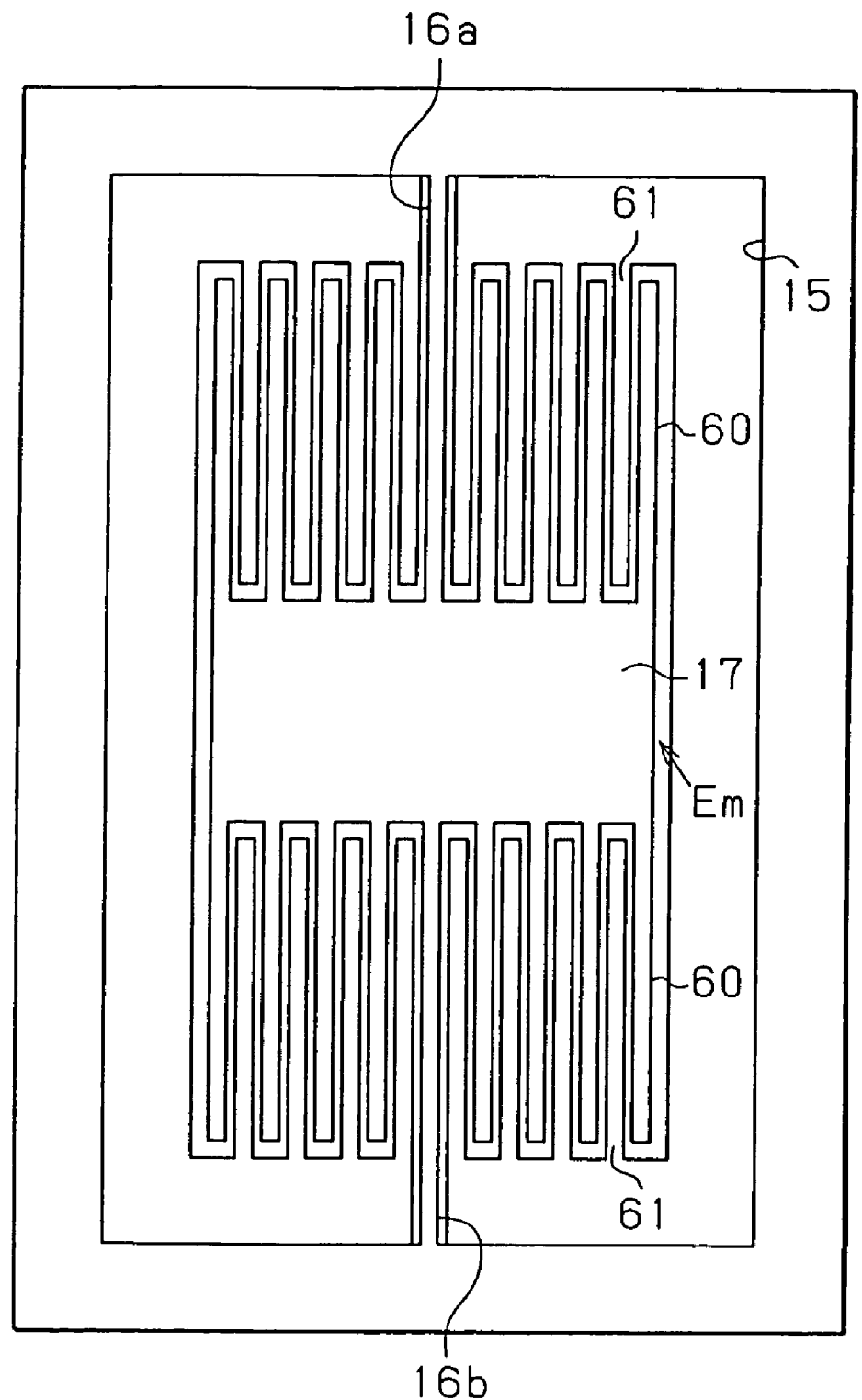
FIG. 27 is a plan view of an exemplary optical scanner.

Rather than the embodiment shown in FIG. 1, teeth 60 provided side by side in movable side comb-tooth electrodes and torsion beams 16a and 16b of a movable structure Em are made to extend in the same direction, and the lengths of the teeth 60 provided side by side in the movable side comb-tooth electrodes may be made half or more of the lengths of the torsion beams 16a and 16b as shown in FIG. 27. By this structure, the overlap of movable side comb-tooth electrodes 60 and fixed side comb-tooth electrodes 61 can be made large (opposite area can be made wide). As a result, the electrostatic force by the potential difference between the movable side comb-tooth electrode and the fixed side comb-tooth electrode can be increased.

Figure 28A:
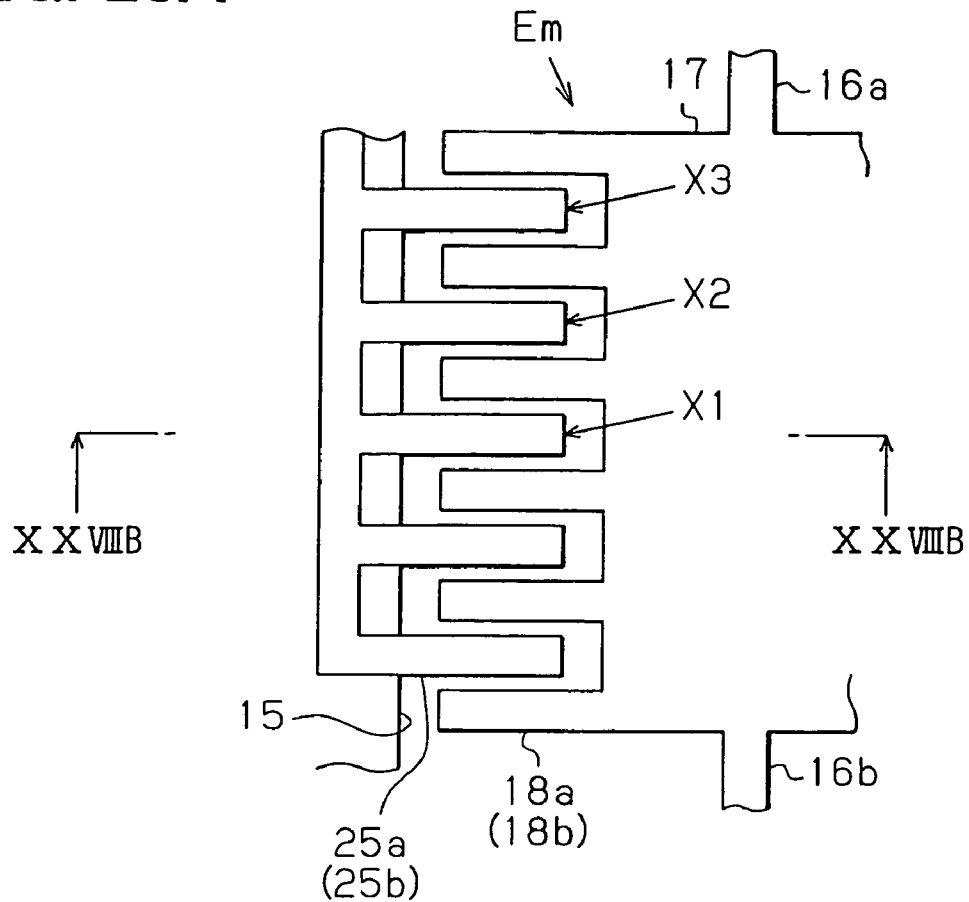
FIGS. 28A-28B are illustrations of the positional relationship between a movable side comb-tooth electrode and a fixed side comb-tooth electrode for an exemplary optical scanner.
Figure 28B:
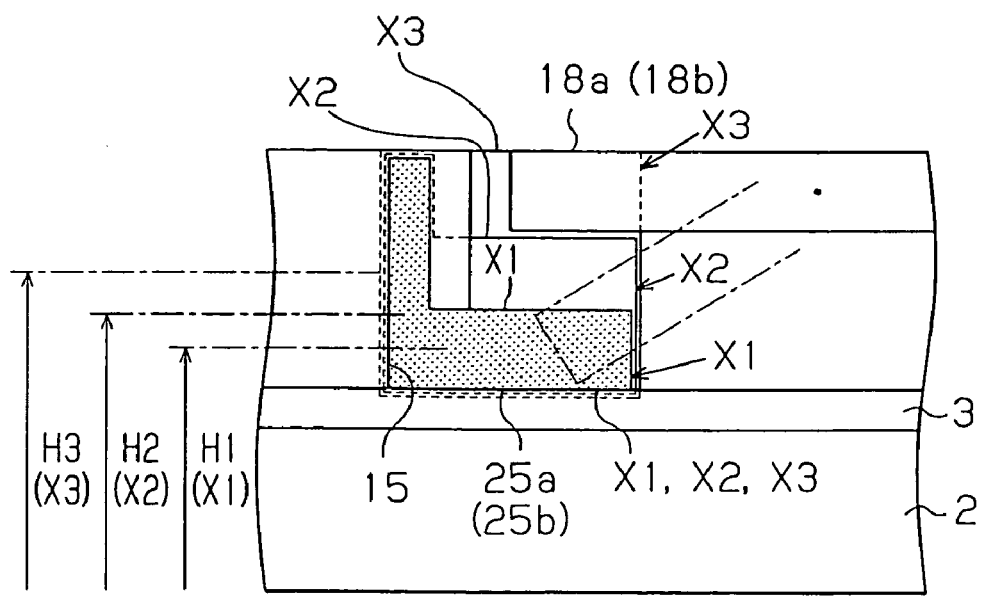

Rather than the embodiment of FIGS. 6A-6B, as shown in FIGS. 28A-28B, in teeth X1, X2 and X3 provided side by side in fixed side comb-tooth electrodes formed in the inside of a through hole 15, their center positions in the vertical direction may be made different from each other as indicated by H1, H2 and H3. As stated above, the heights H1, H2 and H3 of the teeth of the fixed side comb-tooth electrode are made different from each other, so that when the movable part (mirror) 17 is inclined, the attracting force can be further intensified. That is, it is possible to intensify the electrostatic force by the potential difference between the movable side comb-tooth electrode and the fixed side comb-tooth electrode when the movable side comb-tooth electrode is swung (when deflected). In this case, the movable part 17 (mirror) can be changed to an arbitrary angle by applying an arbitrary voltage to the fixed side and the movable side comb-tooth electrodes.

Figure 29A:
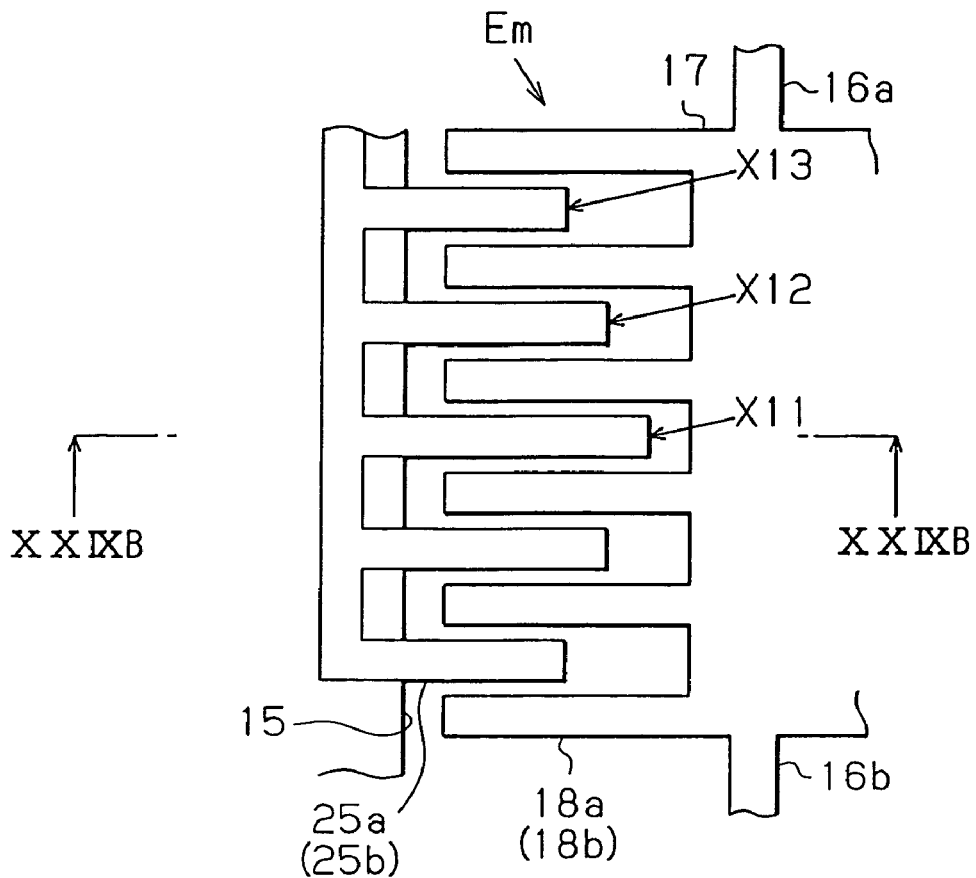
FIGS. 29A-29B are illustrations of the positional relationship between a movable side comb-tooth electrode and a fixed side comb-tooth electrode for an exemplary optical scanner.
Figure 29B:
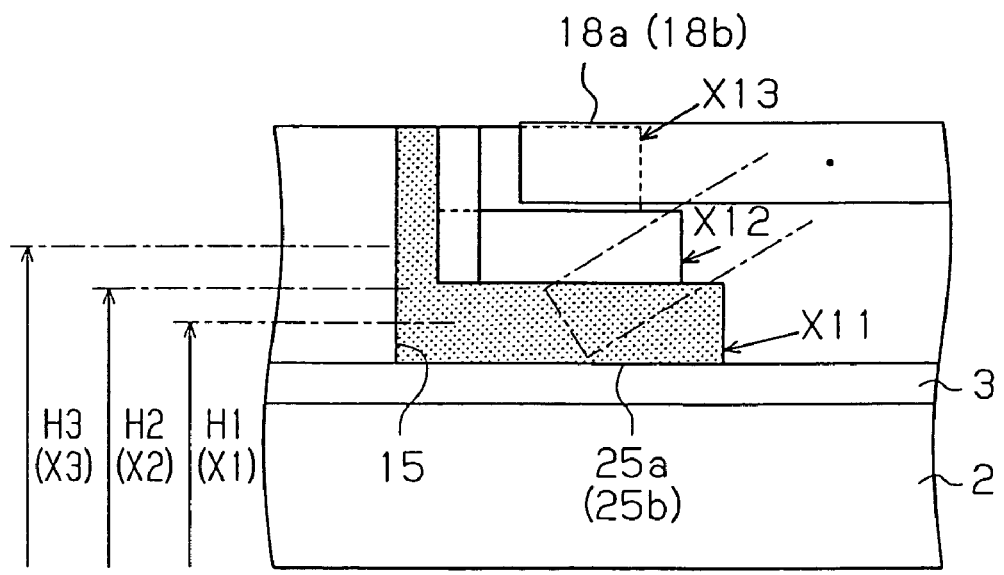

Further, as shown in FIGS. 29A-29B, with respect to teeth X1, X2 and X3 provided side by side in a fixed side comb-tooth electrode formed in the inside of a through hole 15, their center positions in the vertical direction may be different from each other, and their lengths may be made different from each other. That is, a part of the teeth of the fixed side comb-tooth electrode are extended in the direction of approaching the movable side comb-tooth electrode. In FIGS. 28A-28B, when the movable part (mirror) 17 is inclined (when rotated), it is displaced in the direction where the movable side comb-tooth electrode moves away from the fixed side comb-tooth electrode. In comparison, in FIGS. 29A-29B, when the movable part (mirror) 17 is inclined, it becomes possible to keep the distance between the teeth of the fixed side comb-tooth electrode and the movable side comb-tooth electrode constant, and a state where attracting force is high can be kept.

Next, a description will be given to a case where the optical scanner of the embodiment, which has been described, is installed in an obstruction detection apparatus for detecting an obstruction existing in front of a vehicle.

The obstruction detection apparatus measures a distance from a vehicle to a forward vehicle in traveling, and measures the distance between the vehicles. At this time, a laser beam is irradiated to the movable structure Em of FIG. 1, and the reflected light of the laser beam in accordance with the swing of the movable structure Em is scanned in a specified angle range. Particularly, a laser beam is irradiated to the forward vehicle at intervals of, for example, 0.5 second from the vehicle in which the apparatus is mounted, and the distance between the vehicles is measured from the time elapsed before the reflected light from the forward vehicle is received. For example, when the mirror surface is rotated at a speed of 1° per 0.5 second, the distance to the forward vehicle existing in a viewing angle of 10° is measured in five seconds.

Figure 30A:
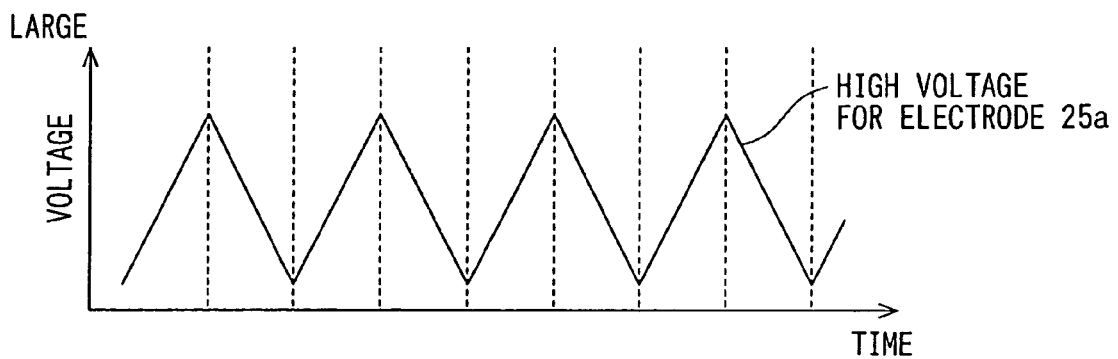
Figure 30B:
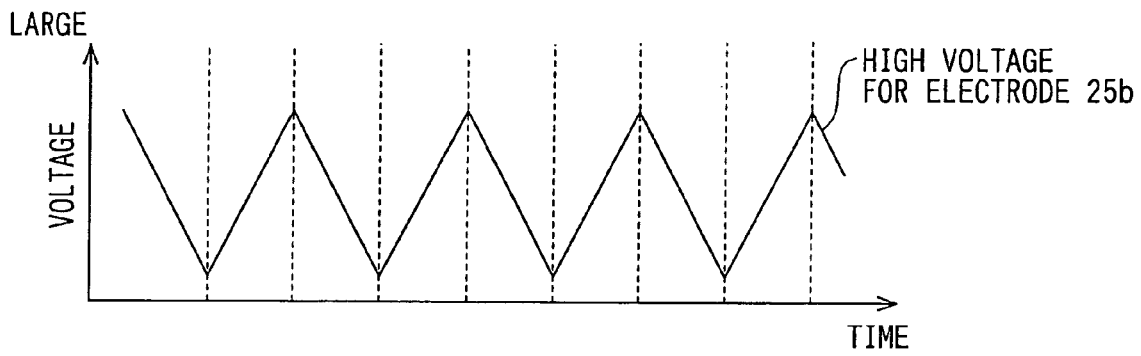
FIG. 30B is a voltage waveform applied to comb-tooth electrode 25b.

As voltage applied to the comb-tooth electrode 25a and the comb-tooth electrode 25b in FIG. 1 at this time, waveforms shown in FIGS. 30A-30B are adopted. That is, the waveform of the voltage applied to the comb-tooth electrode 25a and the waveform of the voltage applied to the comb-tooth electrode 25b are triangular waves, and they are shifted from each other by a half period (they are shifted in phase by 180°). By using the waveforms of the reverse phases, attractive force is generated between the electrodes when the voltages are applied, so that the attractive force is always received from one of the electrodes. The waveform of the voltage applied to the comb-tooth electrode 25a, 25b is not limited to the triangular wave as shown in FIGS. 30A-30B, and it may be made an optimum waveform so that the rotation of the movable part (mirror surface) 17 can be controlled in a state where the attractive force is balanced with the restoring force of the torsion beam.

When the laser beam is irradiated to the movable structure Em, and the reflected light of the laser beam is scanned in the specified angle range in accordance with the swing of the movable structure Em, the movable structure Em is swung in a long period corresponding to the period of emission of the laser beam. That is, when the reflected light of the laser beam intermittently irradiated to the movable structure Em is emitted in the specified angle range in accordance with the swing of the movable structure Em, the movable structure Em is swung forcibly in synchronization with the period of the intermittent irradiation of the laser beam by the potential difference (applied voltage) generated between the movable side comb-tooth electrode 18a, 18b and the fixed side comb-tooth electrode 25a, 25b. This is preferably as will be discussed below.

Figure 36:
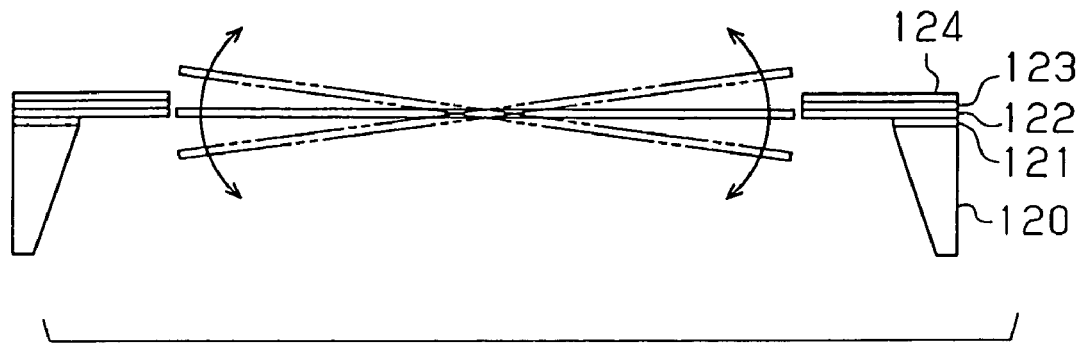
FIG. 36 is a sectional view of an optical scanner for explaining the related art.

When the electrostatic drive type scanning mirror is used to detect, for example, an obstruction existing in front of a vehicle, there is a problem that a scan frequency is excessively high. In the related art electrostatic drive type scanning mirror, as shown in FIG. 36, AC potential is applied to the comb-tooth electrodes facing each other in the same plane, so that the mirror surface is rotated around the fixed axis. This motion is a resonant motion and is limited by the natural frequency determined from the mass of the mirror surface structure as the moving structure and the spring constant of the torsion beam supporting this. In general, in a micro-device (MEMS) using a silicon wafer, the thickness of a mirror surface structure is about 10 μm, its area is about 1 mm$^2$, its rotation angle is about 10°, and the natural frequency is several kHz. On the other hand, in a radar using a laser, the light emission period of the laser is 10 Hz or lower. When the emission angle of the laser is scanned at a period of several Hz by using a scanner oscillating at a frequency of several kHz, it is necessary to control the timing of the emission of the laser and the angle of the scanner with an accuracy of 1/1000. This is very difficult in the use environment of the vehicle in which outer factors such as oscillation and temperature are strong. Further, since the driving principle is of a resonant type, the frequency can not be arbitrarily controlled, and it is also impossible to fix the angle and to stop it.

Then, scanning is performed at a long period linking with the period of laser output, that is, at a low frequency linking with the output frequency of the laser. For that purpose, the mirror angle is forcibly varied by the voltage applied to the comb-tooth electrodes 25a and 25b, so that the low frequency scan operation synchronizing with the laser emission frequency (period of laser output) is performed. Besides, a suitable voltage is applied to the comb-tooth electrodes, so that the mirror surface is fixed to an arbitrary angle.

Figure 31:
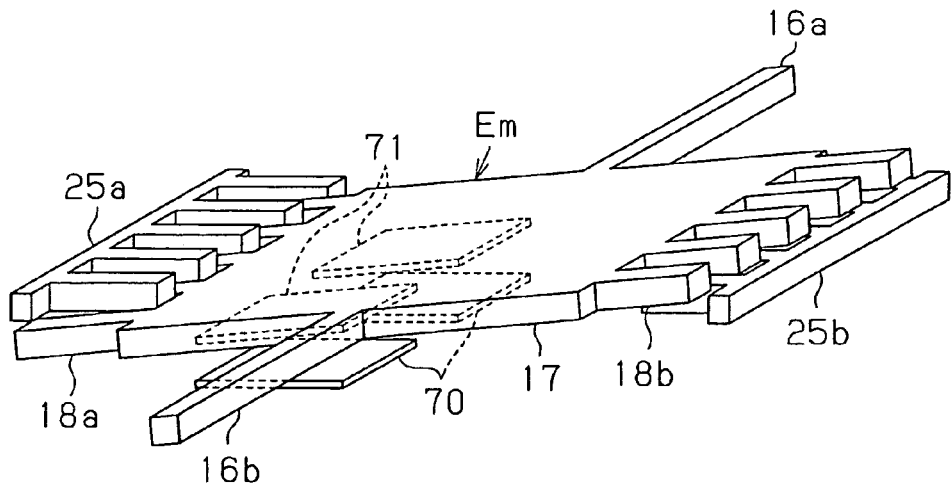
FIG. 31 is a perspective view of an optical scanner for explanatory purposes.

Further, in order to cause a stable rotation operation to be performed without being influenced by a disturbance, the angle is always measured and is grasped. For that purpose, a structure as shown in FIGS. 31 and 32A-32B is adopted. In FIGS. 31 and 32A-32B, a capacity measurement movable electrode (flat plate electrode) 71 is disposed in one of areas obtained by dividing the lower surface of a movable part (mirror surface) 17 by an axis (line through torsion beams 16a and 16b), and a capacity measurement fixed electrode (flat plate electrode) 70 is disposed on the upper surface of a support substrate 1 so as to face the electrode 71. The electrostatic capacity between the electrode 70 and the electrode 71 is measured, and the angle of the mirror is calculated. Then, the measured electrostatic capacity (angle of the mirror) is fed back to a voltage generation circuit for generating the applied voltage to the comb-tooth electrodes 25a and 25b. In this voltage generation circuit, the applied voltage of FIG. 30 is finely adjusted. That is, the capacity between the flat plate electrodes is measured to calculate the angle of the mirror, and this is fed back to the applied voltage, so that the control accuracy of the mirror angle is improved.

As stated above, there are provided the capacity measurement fixed electrode 70 provided on the support substrate 1 disposed under the laminate substrate 10 and the capacity measurement movable electrode 71 provided on the movable structure Em, facing the capacity measurement fixed electrode 70, and displacing in the direction of approaching and moving away from the capacity measurement fixed electrode 70 in accordance with the swing of the movable structure Em. Then, while the capacity between the capacity measurement fixed electrode 70 and the capacity measurement movable electrode 71 is measured to obtain the swing angle of the movable structure Em (the angle of the mirror surface is grasped), the potential difference generated between the movable side comb-tooth electrode 18a, 18b and the fixed side comb-tooth electrode 25a, 25b is controlled so that a desired swing angle (deflection angle) of the movable structure Em is obtained or a swing operation is performed. That is, the optimum voltage is applied to the comb-tooth electrodes, so that the rotation operation of the mirror, and the angle of the mirror are controlled.

Figure 33:
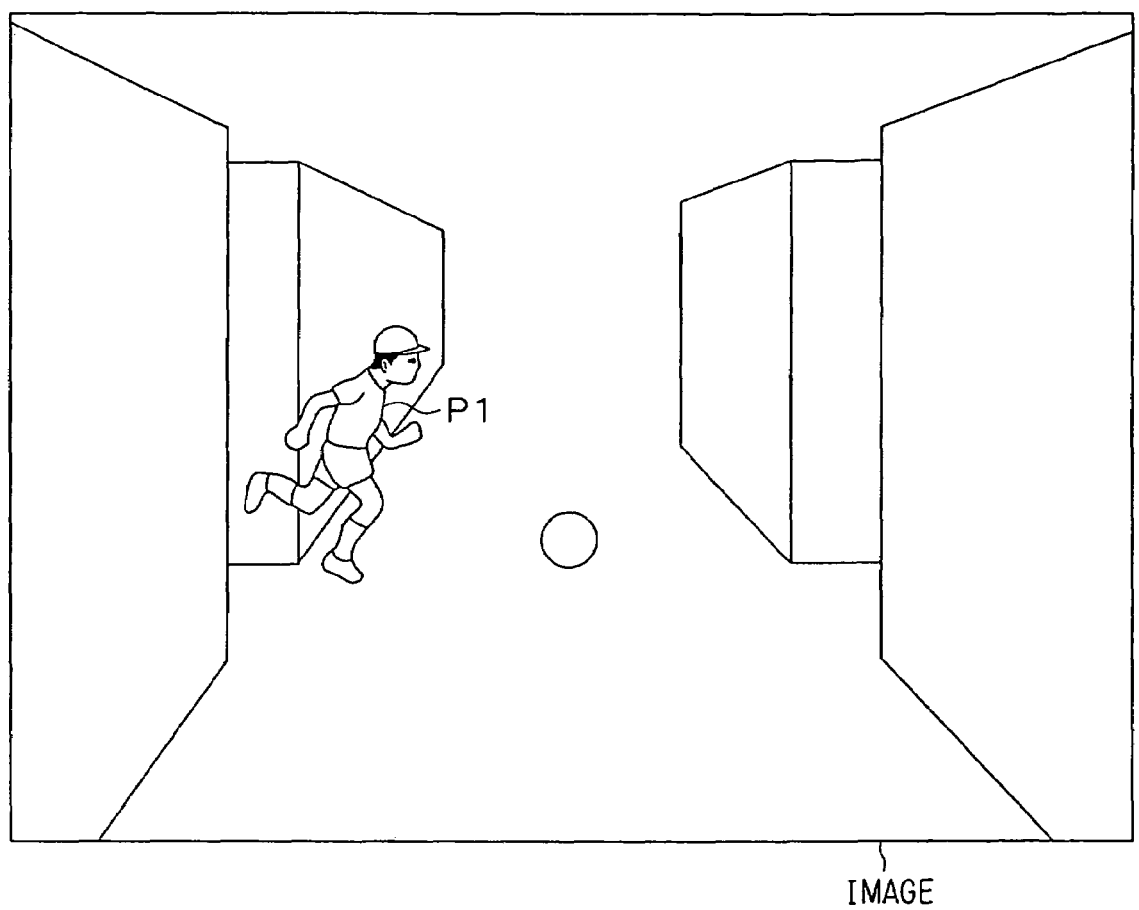
FIG. 33 is a view showing a photographed image for explaining an applied example.
Figure 34:
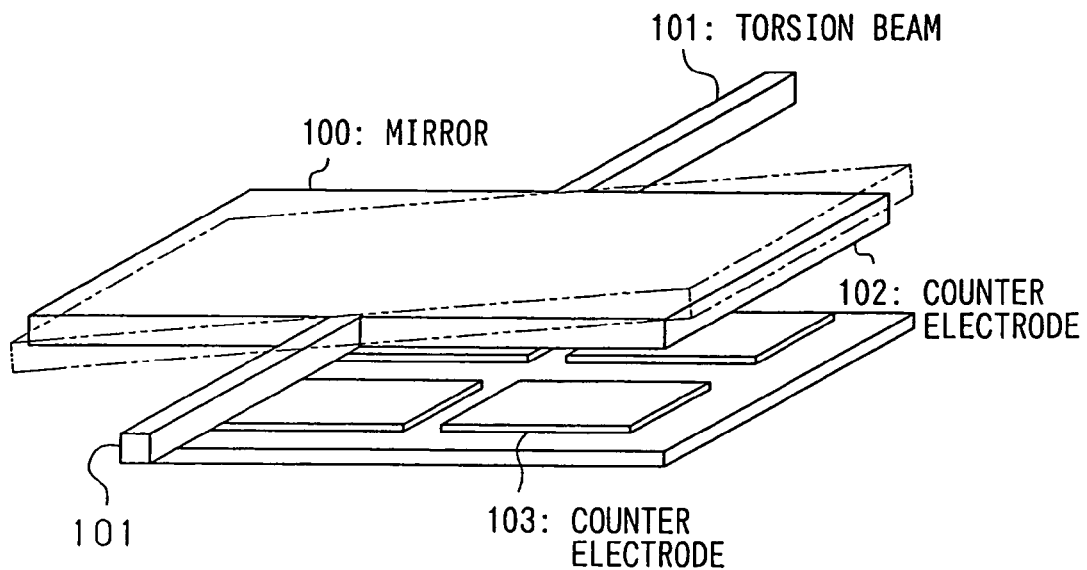
FIG. 34 is a perspective view of an optical scanner for explaining the related art.
Figure 35:
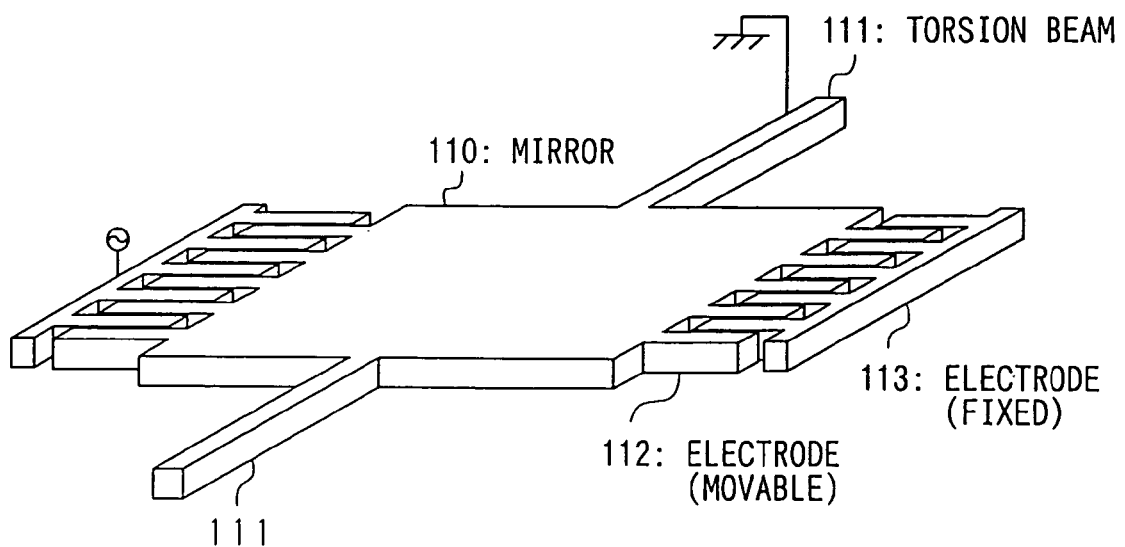
FIG. 35 is a perspective view of an optical scanner for explaining the related art.

Uses other than the measurement of the following distance to a forward vehicle are conceivable. In this case, as shown in FIG. 33, it is appropriate to actually measure a distance to an object (distance measurement object) P1 at an arbitrary point in an image taken by a camera.

Particularly, like parking assistance or detection (pre-accident sensor) of a pedestrian running into the traveling lane on a general road, an image is often used for detecting an obstruction including an object other than a vehicle at a relatively short distance of 10 m or less. This is such that an image obtained using a CCD camera or the like is analyzed, an object is judged from a technique of image recognition or the like, and a distance to the object is measured using a method of stereovision and the like. However, there is a problem that the amount of information of data is large and analysis is complicated, and in the case where the stereovision is used, two or more cameras are required. On the other hand, when one camera is used, there is a problem that the accuracy is low. In this case, a peripheral image is taken by one camera, and after image recognition is performed, respective objects are identified, and then, the mirror of the scanner is directed toward the necessary object and is fixed, and the distance to this object is measured. In this embodiment, for example, with respect to an object (pedestrian running out into a road as shown in FIG. 33) abruptly appearing in front of a traveling vehicle, a distance to the object is instantaneously measured, a time to the collision is calculated from a relative speed with respect to a traveling speed of the vehicle itself, and optimum control and an action for protecting the pedestrian is given. In the usage of the parking assistance, in the case where an obstruction exists in the inside of a parking zone, the distance to the obstruction is actually measured, and optimum control is given.

As stated above, the movable structure Em is swung so that the reflected light of the laser beam irradiated to the movable structure Em is directed toward the distance measurement object P1 at a specified place in the image taken by the camera. That is, the distance to an object at an arbitrary point in the image taken by the camera is actually measured.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for manufacturing an electrostatic actuator comprised of a laminate substrate including a thin film silicon layer formed on a silicon substrate through a buried insulating film, a movable structure including a torsion beam and a movable side comb-tooth electrode, and a fixed side comb-tooth electrode disposed to face the movable side comb-tooth electrode, wherein the movable structure is constructed with the thin film silicon layer, wherein a potential difference is generated between the electrodes to swing the movable structure, the method comprising:
   disposing the laminate substrate on a support substrate;
   forming a through hole deeper than the movable structure, wherein the through hole is bored through the laminate substrate in a formation area of the fixed side comb-tooth electrode in the laminate substrate;
   filling the through hole with a conductive material to form the fixed side comb-tooth electrode;
   removing the thin film silicon layer and the buried insulating film around a formation area of the movable structure in the laminate substrate by trench etching; and
   removing the silicon substrate in the formation area of the movable structure by etching.

2. A method for manufacturing an electrostatic actuator comprised of a laminate substrate including a thin film silicon layer formed on a silicon substrate through a buried insulating film, a movable structure including a torsion beam and a movable side comb-tooth electrode, and a fixed side comb-tooth electrode disposed to face the movable side comb-tooth electrode, wherein the movable structure is constructed with the thin film silicon layer, wherein a potential difference is generated between the electrodes to swing the movable structure, the method comprising:
   disposing the laminate substrate on a support substrate;
   forming a through hole deeper than the movable structure, wherein the through hole is bored through the laminate substrate in a formation area of the fixed side comb-tooth electrode in the laminate substrate;
   forming a protection film on a side wall of the trough hole;
   filling an inner space of the protection film with a conductive material to form the fixed side comb-tooth electrode;
   removing the thin film silicon layer and the buried insulating film around a formation area of the movable structure in the laminate substrate by trench etching; and
   removing the silicon substrate in the formation area of the movable structure by etching using the protection film as an etching stopper and by forming step structure between the movable side comb-toot electrode and the fixed side comb-tooth electrode.

* * * * *